US012662418B2

(12) United States Patent (10) Patent No.: US 12,662,418 B2

Azuma (45) Date of Patent: Jun. 23, 2026

---

(54) ANNULAR GLASS PLATE, METHOD FOR MANUFACTURING GLASS SUBSTRATE FOR MAGNETIC DISK, GLASS SUBSTRATE FOR MAGNETIC DISK, AND MAGNETIC DISK

(71) Applicant: HOYA CORPORATION, Tokyo (JP)

(72) Inventor: Shuhei Azuma, Hung Yen Province (VN)

(73) Assignee: HOYA CORPORATION, Tokyo (JP)

( * ) Notice: Subject to any disclaimer, the term of this patent is extended or adjusted under 35 U.S.C. 154(b) by 0 days.

(21) Appl. No.: 18/537,768

(22) Filed: Dec. 12, 2023

(65) Prior Publication Data

US 2024/0109807 A1 Apr. 4, 2024

Related U.S. Application Data

(62) Division of application No. 17/631,440, filed as application No. PCT/JP2020/029591 on Jul. 31, 2020, now Pat. No. 11,884,582.

(30) Foreign Application Priority Data

Jul. 31, 2019 (JP) ................................. 2019-140594

(51) Int. Cl.
C03C 23/00 (2006.01)
B23K 26/352 (2014.01)
(Continued)

(52) U.S. Cl.
CPC ........ C03C 23/0025 (2013.01); B23K 26/354 (2015.10); B23K 26/3576 (2018.08);
(Continued)

(58) Field of Classification Search
None
See application file for complete search history.

(56) References Cited

U.S. PATENT DOCUMENTS

| | | | |
|---|---|---|---|
| 2002/0108400 A1 | 8/2002 | Watanabe et al. | |
| 2005/0223744 A1 | 10/2005 | Horisaka et al. | |

(Continued)

FOREIGN PATENT DOCUMENTS

| | | |
|---|---|---|
| CN | 104584126 A | 4/2015 |
| CN | 105009213 A | 10/2015 |

(Continued)

OTHER PUBLICATIONS

WO 2013100154 machine translation, Nakagawa et al., Manufacturing Method for Magnetic Disk Glass Substrate, Jul. 2013 (Year: 2013).*

(Continued)

*Primary Examiner* — Queenie S Dehghan

(74) *Attorney, Agent, or Firm* — Spencer Fane LLP

(57) ABSTRACT

An annular glass plate has an outer circumferential edge surface, an inner circumferential edge surface, and a thickness not larger than 0.6 mm. The outer circumferential edge surface and the inner circumferential edge surface are constituted by molten surfaces. The molten surfaces in the outer circumferential edge surface and the inner circumferential edge surface each have an arithmetic average surface roughness Ra not larger than 0.1 μm and the surface roughness of the molten surface in the inner circumferential edge surface is larger than the surface roughness of the molten surface in the outer circumferential edge surface. The molten surfaces in the inner circumferential edge surface and the outer circumferential edge surface do not bulge relative to both main surfaces of the annular glass plate.

12 Claims, 7 Drawing Sheets

(51) Int. Cl.

| | |
|---|---|
| *B23K 26/354* | (2014.01) |
| *C03B 29/02* | (2006.01) |
| *G11B 5/73* | (2006.01) |
| *G11B 5/84* | (2006.01) |
| *B23K 103/00* | (2006.01) |
| *C03B 33/04* | (2006.01) |
| *C03B 33/09* | (2006.01) |

(52) U.S. Cl.

CPC ........ *C03B 29/025* (2013.01); *G11B 5/73921* (2019.05); *G11B 5/8404* (2013.01); *B23K 2103/54* (2018.08); *C03B 33/04* (2013.01); *C03B 33/091* (2013.01)

(56) References Cited

U.S. PATENT DOCUMENTS

| 2008/0041833 | A1 | 2/2008 | Cavallaro et al. |
|---|---|---|---|
| 2011/0117822 | A1 | 5/2011 | Terada et al. |
| 2011/0171415 | A1 | 7/2011 | Eda et al. |
| 2014/0287269 | A1 | 9/2014 | Eda et al. |
| 2015/0165548 | A1 | 6/2015 | Marjanovic et al. |
| 2015/0255103 | A1 | 9/2015 | Ueda |
| 2016/0005431 | A1 | 1/2016 | Tamaki et al. |
| 2017/0169849 | A1 | 6/2017 | Tamaki et al. |
| 2017/0263278 | A1 | 9/2017 | Ueda |
| 2017/0297946 | A1 | 10/2017 | Katayama et al. |

FOREIGN PATENT DOCUMENTS

| JP | 2001335336 | A | 12/2001 |
|---|---|---|---|
| JP | 2002150546 | A | 5/2002 |
| JP | 2003160348 | A | 6/2003 |
| JP | 2006018998 | A | 1/2006 |
| JP | 2010501456 | A | 1/2010 |
| JP | 2010108592 | A | 5/2010 |
| JP | 2011104713 | A | 6/2011 |
| JP | 2015181085 | A | 10/2015 |
| JP | 2017511777 | A | 4/2017 |
| WO | 2016111158 | A1 | 7/2016 |
| WO | 2017090260 | A1 | 6/2017 |

OTHER PUBLICATIONS

International Search Report in PCT/JP2020/029591 dated Oct. 13, 2020.

\* cited by examiner

ANNULAR GLASS PLATE, METHOD FOR MANUFACTURING GLASS SUBSTRATE FOR MAGNETIC DISK, GLASS SUBSTRATE FOR MAGNETIC DISK, AND MAGNETIC DISK

CROSS-REFERENCE TO RELATED APPLICATIONS

This is a divisional application of U.S. patent application Ser. No. 17/631,440, filed on Jan. 28, 2022, which is a U.S. National stage application of International Patent Application No. PCT/JP2020/029591, filed on Jul. 31, 2020, which claims priority to Japanese Patent Application No. 2019-140594 filed in Japan on Jul. 31, 2019. The entire contents of U.S. patent application Ser. No. 17/631,440 and Japanese Patent Application No. 2019-140594 are hereby incorporated herein by reference.

BACKGROUND

Field of the Invention

The present invention relates to: a method for manufacturing an annular glass plate in which an annular glass plate to be used to form a glass substrate for a magnetic disk is manufactured using a laser beam; a method for manufacturing a glass substrate for a magnetic disk including the method for manufacturing the glass plate; a method for manufacturing a magnetic disk including the method for manufacturing the glass substrate for a magnetic disk; an annular glass plate; a glass substrate for a magnetic disk; and a magnetic disk manufactured using the glass substrate for a magnetic disk.

Background Information

Nowadays, hard disk apparatuses are used to record data in personal computers, notebook-sized personal computers, DVD (Digital Versatile Disc) recording apparatuses, data centers for cloud computing, and the like. A magnetic disk obtained by providing a magnetic layer on a glass substrate for a magnetic disk, which is an annular non-magnetic material, is used in a hard disk apparatus. The magnetic disk is incorporated into a DFH (Disk Flying Height) type magnetic head that has a flying height of about 5 nm, for example.

In such a DFH type magnetic head, the flying height is short, and accordingly attachment of minute particles etc., to main surfaces of the magnetic disk is to be avoided. In order to suppress the attachment of minute particles, it is desirable to precisely polish not only main surfaces of an annular glass plate to be used to form a glass substrate for the magnetic disk but also edge surfaces of the annular glass plate to reduce surface roughness. Also, it is desirable for an annular magnetic disk to have a high degree of roundness so that the magnetic disk can stably rotate at a high speed. Furthermore, when manufacturing a glass substrate for a magnetic disk, in an annular glass plate from which the glass substrate for a magnetic disk is formed as the end product, edge surfaces where particles are likely to be generated are preferably made smooth to prevent minute particles from attaching to the main surfaces and adversely affecting the performance of the magnetic disk. It is also preferable to make the shape of the edge surfaces of the annular glass plate match a target shape in order to incorporate the magnetic disk precisely into an HDD apparatus and make the edge surfaces have a shape that is suitable to be held with a jig that holds an outer circumferential edge surface of the glass substrate when magnetic films are formed on the main surfaces of the glass substrate.

A glass substrate for a magnetic disk is obtained by chamfering edge surfaces of an annular glass blank that is separated and taken out of a glass plate, polishing the edge surfaces, grinding and polishing main surfaces, and washing the glass blank. When taking out the glass blank described above, a technology for taking out the glass blank from the glass plate using a laser beam, instead of performing scribing using a cutter and splitting, is proposed.

In this technology, a plurality of defect lines (perforations) are formed by repeatedly causing the generation of a defect line (perforation) along a laser beam focal line of a pulsed laser beam within the glass plate by directing the laser beam focal line into the glass plate at a predetermined angle of incidence to the glass plate while moving the glass plate and the laser beam parallel to each other. At this time, cracks propagate between adjacent defect lines (perforations), and accordingly an annular glass blank can be cut out from the glass plate. The defect lines (perforations) are spaced apart from each other by a distance of 2 μm.

Also, a method of chamfering edges of the glass blank using a laser beam is known as a method for forming edge surfaces of a glass plate into a target shape by processing edge surfaces of the annular glass blank taken out of the glass plate. Specifically, the edges are cut into a desired chamfered shape using an ultrashort pulse laser, and subsequently to the processing performed using the ultrashort pulse laser, the edges are irradiated with a $CO_2$ laser. For example, see Japanese Patent Application Publication No. 2017-511777A.

SUMMARY

An annular glass plate that is used as a blank for a glass substrate for a magnetic disk can be manufactured from a glass plate using the two technologies described above. In this case, the annular glass blank is taken out based on the defect lines (perforations), and accordingly portions of side surfaces that form cross-sectional shapes of holes constituting the defect lines remain in edge surfaces of the obtained annular glass blank. Therefore, edge surface polishing needs to be performed to obtain a glass substrate for a magnetic disk that has a small surface roughness not only on the main surfaces but also on the edge surfaces from the annular glass blank. With the chamfering technology performed using a laser beam described above, only chamfering of corner portions is performed using the laser beam, and edge surface polishing is not performed through irradiation with the laser beam. On the other hand, conventionally performed edge surface polishing that uses a polishing brush takes a long time and is not preferable in terms of not only manufacturing efficiency but also manufacturing cost. Even when edge surface polishing is performed, it is preferable to perform edge surface polishing using a laser beam so that polishing time can be reduced compared to that required in conventional technologies or the need for edge surface polishing that uses a polishing brush can be eliminated. This is a method of performing polishing by melting glass at the edge surfaces using the laser beam to reduce roughness.

Recently, there is a need to increase the number of magnetic disks that can be installed in a hard disk drive apparatus to increase the capacity thereof, and there is a demand for a reduction in the thickness of the glass substrate for a magnetic disk. On the other hand, there is also a demand for a significant reduction in the manufacturing cost of the glass substrate for a magnetic disk. Therefore, consideration is given to performing edge surface polishing through irradiation with a laser beam, in which chamfering and edge surface polishing are performed together.

It was found that when edge surface polishing was performed by irradiating edge surfaces of an annular glass blank, which was taken out of a glass plate, with a laser beam, an inner circumferential edge surface having the shape of a spherical surface bulging relative to the main surfaces was likely to be generated on the inner circumferential side of the main surfaces due to melting proceeding excessively on the inner circumferential side (inner circumferential edge surface) of the annular glass plate. On the outer circumferential side of the annular glass plate, a spherical surface shape bulging relative to the main surfaces is unlikely to be generated. If there is a bulge on the inner circumferential side of the main surfaces of the annular glass plate (if there is a spherical surface shape formed due to the inner circumferential edge surface bulging relative to the main surfaces), the annular glass plate cannot be stably arranged horizontally when both surfaces of the glass plate are ground or polished in a subsequent processing step of the main surfaces, and a problem may occur such as nonuniformity of the processing performed on the main surfaces or the annular glass plate jutting out from a holding carrier that holds the annular glass plate while both surfaces thereof are ground or polished. In particular, when edge surface polishing is performed by irradiating edge surfaces of an annular glass plate having a thickness not larger than 0.6 mm with a laser beam, a bulge is likely to be generated on the inner circumferential side of the main surfaces of the annular glass plate (the inner circumferential edge surface is likely to have the shape of a spherical surface bulging relative to the main surfaces).

Therefore, an object of the present invention is to provide a method for manufacturing an annular glass plate including processing that realizes edge surface polishing by melting an inner circumferential edge surface and an outer circumferential edge surface of an annular glass blank through irradiation with a laser beam and with which a bulge shape is not generated at the inner circumferential edge surface (on the inner circumferential side of main surfaces), a method for manufacturing a glass substrate for a magnetic disk, and a method for manufacturing a magnetic disk. Furthermore, the present invention provides an annular glass plate, a glass substrate for a magnetic disk, and a magnetic disk.

An aspect of the present invention is an annular glass plate that has an outer circumferential edge surface, an inner circumferential edge surface, and a thickness not larger than 0.6 mm. The outer circumferential edge surface and the inner circumferential edge surface of the annular glass plate are constituted by molten surfaces.

The molten surfaces in the outer circumferential edge surface and the inner circumferential edge surface each have an arithmetic average surface roughness Ra not larger than 0.1 μm, and the surface roughness of the molten surface in the inner circumferential edge surface is larger than the surface roughness of the molten surface in the outer circumferential edge surface.

The molten surfaces in the inner circumferential edge surface and the outer circumferential edge surface do not bulge relative to both main surfaces of the annular glass plate.

Another aspect of the present invention is a method for manufacturing a glass substrate for a magnetic disk, that comprises manufacturing a glass substrate for a magnetic disk by performing at least polishing processing on main surfaces of the annular glass plate.

Another aspect of the present invention is a glass substrate for a magnetic disk, which has an outer circumferential edge surface, an inner circumferential edge surface, and a thickness not larger than 0.6 mm. The outer circumferential edge surface and the inner circumferential edge surface of the glass substrate for a magnetic disk are constituted by molten surfaces.

The molten surfaces in the outer circumferential edge surface and the inner circumferential edge surface each have an arithmetic average surface roughness Ra not larger than 0.1 μm, and the surface roughness of the molten surface in the inner circumferential edge surface is larger than the surface roughness of the molten surface in the outer circumferential edge surface.

The molten surfaces in the inner circumferential edge surface and the outer circumferential edge surface do not bulge relative to both main surfaces of the glass substrate for a magnetic disk.

The main surfaces have an arithmetic average surface roughness Ra not larger than 0.3 nm.

Another aspect of the present invention is a magnetic disk including the glass substrate for a magnetic disk and magnetic films formed on the main surfaces of the glass substrate for a magnetic disk.

According to the method for manufacturing a glass substrate for a magnetic disk, it is possible to realize edge surface polishing that can be performed in a significantly reduced time when compared to conventional edge surface polishing, and an annular glass plate that does not have a bulge shape at the inner circumferential edge surface (on the inner circumferential side of the main surfaces) can be manufactured.

DETAILED DESCRIPTION OF THE EMBODIMENTS

Figure 1A:
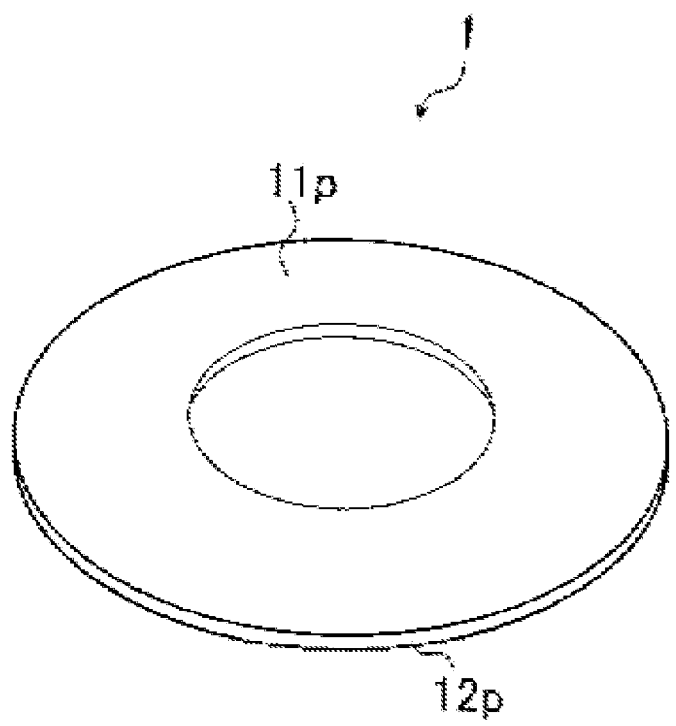
FIG. 1A is a perspective view of an example of a glass substrate for a magnetic disk manufactured in the present embodiment.

The following describes a method for manufacturing an annular glass plate, a method for manufacturing a glass substrate for a magnetic disk, a method for manufacturing a magnetic disk, an annular glass plate, a glass substrate for a magnetic disk, and a magnetic disk according to the present embodiment.

In the present specification, terms "glass plate", "annular glass blank", "annular glass plate", and "glass substrate for a magnetic disk" are used.

The annular glass blank is a plate that is cut out in an annular shape from the glass plate. The annular glass plate is obtained by irradiating an inner circumferential edge surface and an outer circumferential edge surface of the annular glass blank with a laser beam to perform edge surface polishing. The glass substrate for a magnetic disk is obtained by grinding, polishing, and washing main surfaces of the annular glass plate and performing chemical strengthening processing as necessary.

An annular glass plate that is manufactured using the method for manufacturing an annular glass plate according to the present embodiment has a thickness not larger than 0.6 mm. When the annular glass plate is manufactured using an annular glass blank, grinding and polishing are not performed on the main surfaces, and accordingly, thicknesses of the glass plate and the annular glass blank are also not larger than 0.6 mm. When the annular glass plate is used as the material of a glass substrate for a magnetic disk, the smaller the thickness of the annular glass plate is, the more preferable, because the number of magnetic disks that can be installed in a hard disk drive apparatus increases. In the method for manufacturing an annular glass plate according to the present embodiment, an annular glass blank is cut out from a glass plate having a thickness not larger than 0.6 mm along an inner circle and an outer circle that are concentric circles, and an inner circumferential edge surface and an outer circumferential edge surface of the annular glass blank that has been cut out are irradiated with a laser beam to perform edge surface polishing. Through irradiation with the laser beam, chamfered surfaces are formed in the outer circumferential edge surface and the inner circumferential edge surface. Thereafter, main surfaces of the annular glass plate obtained through irradiation with the laser beam are ground and polished, and thus a glass substrate for a magnetic disk is manufactured.

Here, in the edge surface polishing performed using the laser beam (hereinafter may be simply referred to as "laser polishing processing"), molten surfaces are formed by irradiating the outer circumferential edge surface and the inner circumferential edge surface of the annular glass blank with the laser beam to melt the outer circumferential edge surface and the inner circumferential edge surface, and the annular glass plate is formed by performing irradiation with the laser beam such that the molten surfaces in the outer circumferential edge surface and the inner circumferential edge surface each have an arithmetic average surface roughness Ra not larger than 0.1 μm and the surface roughness of the molten surface in the inner circumferential edge surface is larger than the surface roughness of the molten surface in the outer circumferential edge surface.

The molten surfaces are formed by locally heating glass in the vicinity of the edge surfaces of the annular glass blank to a temperature higher than the glass transition point to soften and melt the glass, and then cooling the glass. Most minute irregularities that were present before the surfaces were molten have disappeared due to the surfaces having been once molten. The molten surfaces are formed in the surfaces irradiated with the laser beam.

By being irradiated with the laser beam, the molten surfaces in the inner circumferential edge surface and the outer circumferential edge surface have an arithmetic average surface roughness Ra not larger than 0.1 μm. As a result, the time it takes to perform additional edge surface polishing other than the laser polishing processing can be made zero or significantly reduced compared to that required in conventional technologies, and an annular glass plate that does not have a bulge shape at the inner circumferential edge surface (on the inner circumferential side of the main surfaces) can be manufactured.

When the laser polishing processing was performed to make the two edge surfaces (the inner circumferential edge surface and the outer circumferential edge surface) of an annular glass plate having a thickness not larger than 0.6 mm have an arithmetic average roughness Ra not larger than 0.1 μm, a problem occurred in that the shape of the inner circumferential edge surface became a spherical shape. Reasons for this problem are not entirely clear, but are presumed to be that the thickness of the annular glass blank is as thin as 0.6 mm or less, the irradiated surface has a concave shape when viewed in the direction in which the laser beam is emitted, and heat accumulates more easily in the inner circumferential edge surface than in the outer circumferential edge surface because the inner circumferential edge surface is irradiated with the laser beam in a space that is approximate to a closed space when compared to the case where the outer circumferential edge surface is irradiated with the laser beam, and as a result, the shape of the inner circumferential edge surface easily becomes a spherical shape.

Therefore, in the present embodiment, an adjustment is performed such that the surface roughness of the inner circumferential edge surface becomes larger than the surface roughness of the outer circumferential edge surface through the laser polishing processing performed on the edge surfaces (the inner circumferential edge surface and the outer circumferential edge surface) of the annular glass blank. As a result, it is possible to keep the shape of the inner circumferential edge surface from becoming a spherical surface shape, while polishing the inner circumferential edge surface and the outer circumferential edge surface to be mirror surfaces having an arithmetic average roughness Ra not larger than 0.1 μm. Although both edge surfaces are polished to be minor surfaces having an arithmetic average roughness Ra not larger than 0.1 μm, it is preferable that the molten surface in the inner circumferential edge surface has an arithmetic average roughness Ra of 0.01 to 0.1 μm, and the molten surface in the outer circumferential edge surface has an arithmetic average roughness Ra of 0.001 to 0.05 μm.

In an example of the method for manufacturing an annular glass plate described below, separation processing for taking out an annular glass blank from a glass plate is performed using a laser beam that differs from the laser beam used in the laser polishing processing. In the following description, the laser beam used to cut out an annular glass blank from a glass plate will be referred to as a "cutting laser beam", and the laser beam used in the laser polishing processing will be referred to as an "edge-surface-polishing laser beam". The separation processing in the present embodiment is performed using a laser beam, but this separation processing is an example, and there is no limitation to the separation processing performed using a laser beam. For example, splitting may be performed using a conventionally used scriber.

First, the separation processing that is initially performed using a laser beam will be described. In the separation processing, defects are intermittently formed along substantially concentric circles by irradiating a glass plate with the cutting laser beam, and circular separation boundary lines, which are line-shaped defects and constituted by an inner circumferential circle portion and an outer circumferential circle portion, are formed on the main surface of the glass plate by connecting the defects. Misalignment between center positions of the inner circumferential circle portion and the outer circumferential circle portion formed along the substantially concentric circles is not larger than 10 μm, for example.

In the irradiation with the cutting laser beam, for example, two circular crack starting portions, which will be the inner circumferential circle portion and the outer circumferential circle portion, are formed inside the glass plate by moving the cutting laser beam relative to the glass plate to draw circles with the focal position of the cutting laser beam when viewed from the main surface of the glass plate. Thereafter, the separation boundary lines are formed by causing cracks to develop from respective positions of the circular crack starting portions. An annular glass blank is separated and taken out of the glass plate along the separation boundary lines. The crack starting portions are portions in which the formation of blemishes, melting, degradation, or alteration occurs through irradiation with the cutting laser beam, for example. Here, the circular separation boundary lines are formed by causing cracks to develop from the circular crack starting portions, but in many cases, the glass blank cannot be taken out of the glass plate by physical means even if the circular separation boundary lines are formed in the glass plate. Therefore, portions of the glass plate on the outer side of the circular boundary lines are heated to separate and take out the glass blank from the glass plate. In the present embodiment, the two circular separation boundary lines, which serve as the inner circumferential circle portion and the outer circumferential circle portion, are formed along concentric circles, and accordingly, a portion on the outer side of the outer circumferential circle portion is removed by heating the portion on the outer side of the outer circumferential circle portion to cause the portion on the outer side to thermally expand relatively largely compared to a portion on the inner side of the outer circumferential circle portion, and to separate the portion on the outer side of the outer circumferential circle portion from the portion on the inner side of the outer circumferential circle portion. Furthermore, a portion on the inner side of the inner circumferential circle portion is removed by heating a portion on the outer side of the inner circumferential circle portion to cause the portion on the outer side to thermally expand relatively largely compared to the portion on the inner side of the inner circumferential circle portion, and to separate the portion on the inner side of the inner circumferential circle portion from the portion on the outer side of the inner circumferential circle portion. Thus, an annular glass blank including a circular hole, which corresponds to the portion on the outer side of the inner circumferential circle portion and the portion on the inner side of the outer circumferential circle portion, can be obtained. Note that either one of the processing of heating the portion on the outer side of the outer circumferential circle portion to separate and remove the portion on the outer side from the portion on the inner side and the processing of heating the portion on the outer side of the inner circumferential circle portion to separate and remove the portion on the inner side from the portion on the outer side may be performed earlier than the other.

Note that when forming the separation boundary lines by forming line-shaped cracks connecting defects intermittently formed through irradiation with the cutting laser beam, the separation boundary lines may be formed using a laser beam other than the cutting laser beam, for example.

Defects include blemishes, molten portions, degraded portions, and altered portions (hereinafter referred to as "blemishes etc.") that are formed in glass, holes (including through holes and bottomed holes) that are sharply recessed from the main surface of the glass plate and have small cross sections, cracks, etc. These defects serve as cores in the generation of cracks that are to develop. Intermittently forming defects includes forming blemishes etc., or a plurality of holes (including through holes and bottomed holes) having small cross sections, which serve as cores in the generation of cracks, in the thickness direction of the glass plate such that there are spaces between the blemishes etc., or the holes. Forming separation boundary lines includes forming defects, such as cracks, that extend in the form of lines that connect intermittently-formed defects in the form of lines. Cracks include apparent cracks that form physical gaps in a glass material, as well as potential cracks that do not form physical gaps but form a boundary surface. Separating the glass blank from the glass plate includes removing an outer portion that surrounds the glass blank such that a separated edge defines a circular outer circumference and removing an inner portion that is surrounded by the glass blank such that a circular hole is formed at the center.

Thereafter, before grinding/polishing processing, which will be described later, laser polishing processing is performed using the edge-surface-polishing laser beam, through which the inner circumferential edge surface and the outer circumferential edge surface become smooth, or specifically, have an arithmetic average roughness Ra not larger than 0.1 μm. At this time, chamfered surfaces are also formed at boundaries between the edge surfaces and the main surfaces.

When separation surfaces (the inner circumferential edge surface and the outer circumferential edge surface) of the annular glass blank taken out of the glass plate through the separation processing are irradiated with the edge-surface-polishing laser beam, the separation surfaces are melted such that the surface roughness of a molten surface formed in the inner circumferential edge surface through the irradiation with the edge-surface-polishing laser beam becomes larger than the surface roughness of a molten surface formed in the outer circumferential edge surface through the irradiation with the edge-surface-polishing laser beam.

Thereafter, at least one of grinding and polishing is performed on the main surfaces of the annular glass plate.

At this time, it is preferable to form the annular glass plate through the irradiation with the edge-surface-polishing laser beam such that the molten surfaces in the inner circumferential edge surface and the outer circumferential edge surface have an arithmetic average surface roughness Ra not larger than 0.1 μm and the roundness of the annular glass plate is not larger than 15 μm, in terms of omitting additional edge surface polishing other than the laser polishing processing or reducing the time it takes to perform the additional edge surface polishing. The surface roughness of the molten surfaces in the inner circumferential edge surface and the outer circumferential edge surface is more preferably not larger than 0.05 μm.

The roundness is measured by, for example, arranging a plate-shaped probe that is thicker than the annular glass plate such that the probe faces an edge surface of the annular glass plate in a direction perpendicular to the main surfaces of the annular glass plate, acquiring an outline while rotating the annular glass plate in the circumferential direction, and calculating a difference between the radius of an inscribed circle and the radius of a circumscribed circle of the outline, as the roundness of the annular glass plate. Note that the roundness can be measured using a roundness and cylindrical shape measuring apparatus, for example.

The arithmetic average roughness Ra is a value in accordance with JIS B0601:2001. In order to determine the arithmetic average roughness Ra, a surface shape of an edge surface of the annular glass plate is measured using a laser microscope in an evaluation region of 50 μm×50 μm under the following conditions.

Observation magnification: 3000× magnification
Measurement pitch in height direction (Z axis): 0.01 μm
Cut-off value λs: 0.25 μm
Cut-off value λc: 80 μm Note that resolution in the height direction is preferably not larger than 1 nm. Although the observation magnification is 3000× magnification in the present embodiment, the observation magnification is appropriately selected from a range of about 1000× to about 3000× magnification depending on the size of the surface to be measured.

In the above-described irradiation with the cutting laser beam, an optical system of a laser beam source may be adjusted such that the focal position of the cutting laser beam is located in an inner portion of the glass plate in its thickness direction. Light energy concentrates at the focal position and the focal position is locally heated to form the crack starting portions inside the glass. Thereafter, cracks are caused to develop from the crack starting portions toward the main surfaces. A split surface that is formed through cracking has a small surface roughness. Also, by using a moving mechanism that can precisely move the cutting laser beam relative to the glass plate, for example, it is possible to realize a high degree of roundness of a circle that is formed by the trajectory of the focal position. Although there may be cases where the arithmetic average roughness Ra of a separation surface of the annular glass blank that has been separated and taken out of the glass plate is large and the degree of roundness is low, chamfered surfaces are formed while glass in the vicinity of the separation surface is melted by heat by irradiating the separation surface with the edge-surface-polishing laser beam from the normal direction of the separation surface, and therefore the surface roughness of the separation surface can be reduced and precision of the roundness can be improved through the irradiation with the edge-surface-polishing laser beam at the same time that the chamfered surfaces are formed through the irradiation with the edge-surface-polishing laser beam. Thus, the molten surfaces can have an arithmetic average surface roughness Ra not larger than 0.1 μm and the annular glass plate can have a roundness not larger than 15 μm. According to one embodiment, the roundness can be set to 0.1 to 15 μm. The roundness is preferably not larger than 10 μm, more preferably not larger than 7 μm, and further preferably not larger than 5 μm.

The following describes a method for manufacturing a glass substrate for a magnetic disk as an example of a method for manufacturing an annular glass plate according to the present embodiment, with reference to the drawings.

Figure 1B:
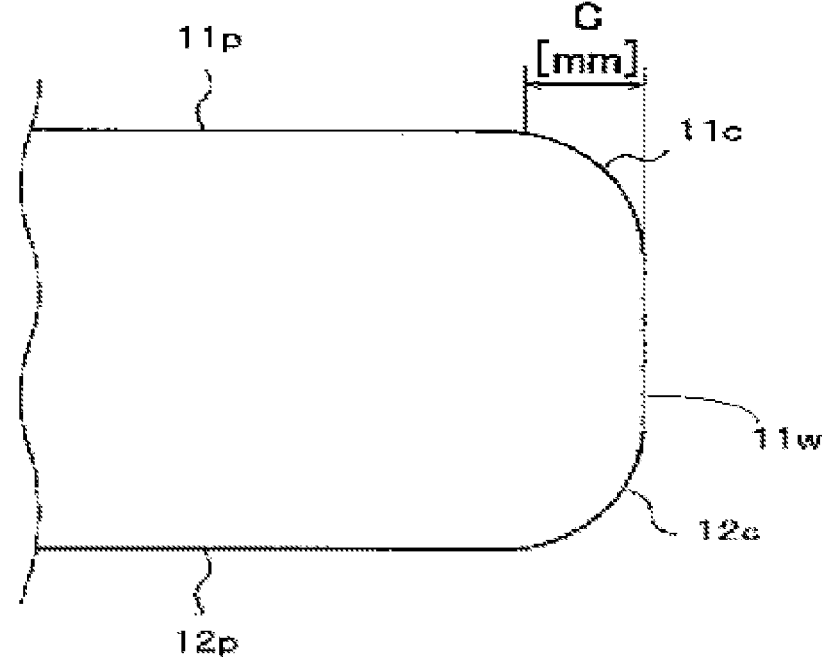
FIG. 1B is a diagram showing an example of a cross section of an outer circumferential edge surface of the glass substrate for a magnetic disk shown in FIG. 1A.

FIG. 1A is a perspective view of one example of a glass substrate for a magnetic disk manufactured in the present embodiment. FIG. 1B is a diagram showing one example of a cross section of an outer circumferential edge surface of the glass substrate for a magnetic disk shown in FIG. 1A. A glass substrate 1 for a magnetic disk (hereinafter referred to as a "glass substrate") shown in FIG. 1A is a glass substrate constituted by an annular thin plate that includes a circular hole at the center. Although the size of the glass substrate for a magnetic disk is not limited, the glass substrate for a magnetic disk has the size of a glass substrate for a magnetic disk that has a nominal diameter of 2.5 inches or 3.5 inches, for example. In the case of a glass substrate for a magnetic disk having a nominal diameter of 3.5 inches, the outer diameter (nominal value) is 95 mm to 97 mm and the inner diameter (nominal value) is 25 mm, for example. In the case of a glass substrate for a magnetic disk having a nominal diameter of 2.5 inches, the outer diameter (nominal value) is 65 mm to 67 mm and the inner diameter (nominal value) is 20 mm, for example. The thickness of the glass substrate for a magnetic disk is 0.20 mm to 0.6 mm, preferably 0.30 mm to 0.6 mm, and preferably 0.30 mm to 0.53 mm, for example. A magnetic disk is manufactured by forming magnetic layers on main surfaces of the glass substrate 1.

The glass substrate 1 includes a pair of main surfaces 11p and 12p, a side wall surface 11w that is formed on an outer circumferential edge surface, chamfered surfaces 11c and 12c that are respectively located between the side wall surface 11w and the main surfaces 11p and 12p, a side wall surface (not shown) that is formed on an inner circumferential edge surface similarly to the outer circumferential edge surface, and chamfered surfaces (not shown) that are respectively located between the side wall surface 11w formed on the inner circumferential edge surface and the main surfaces 11p and 12p. The glass substrate 1 includes a circular hole in a central portion. The side wall surface 11w includes a center position in the thickness direction of the glass substrate 1. Although a length C of the chamfered surface 11c shown in FIG. 1B is long, the length of the chamfered surface 11c may be shorter than the length C shown in FIG. 1B. As shown in FIG. 1B, the chamfered surfaces 11c and 12c are formed as a result of edges being rounded and have smoothly curved shapes that are continuous from the main surfaces 11p and 12p to the side wall surface 11w. The chamfered surfaces 11c and 12c may be straight chamfered surfaces, rather than being curved in a cross section as shown in FIG. 1B.

Figure 2A:
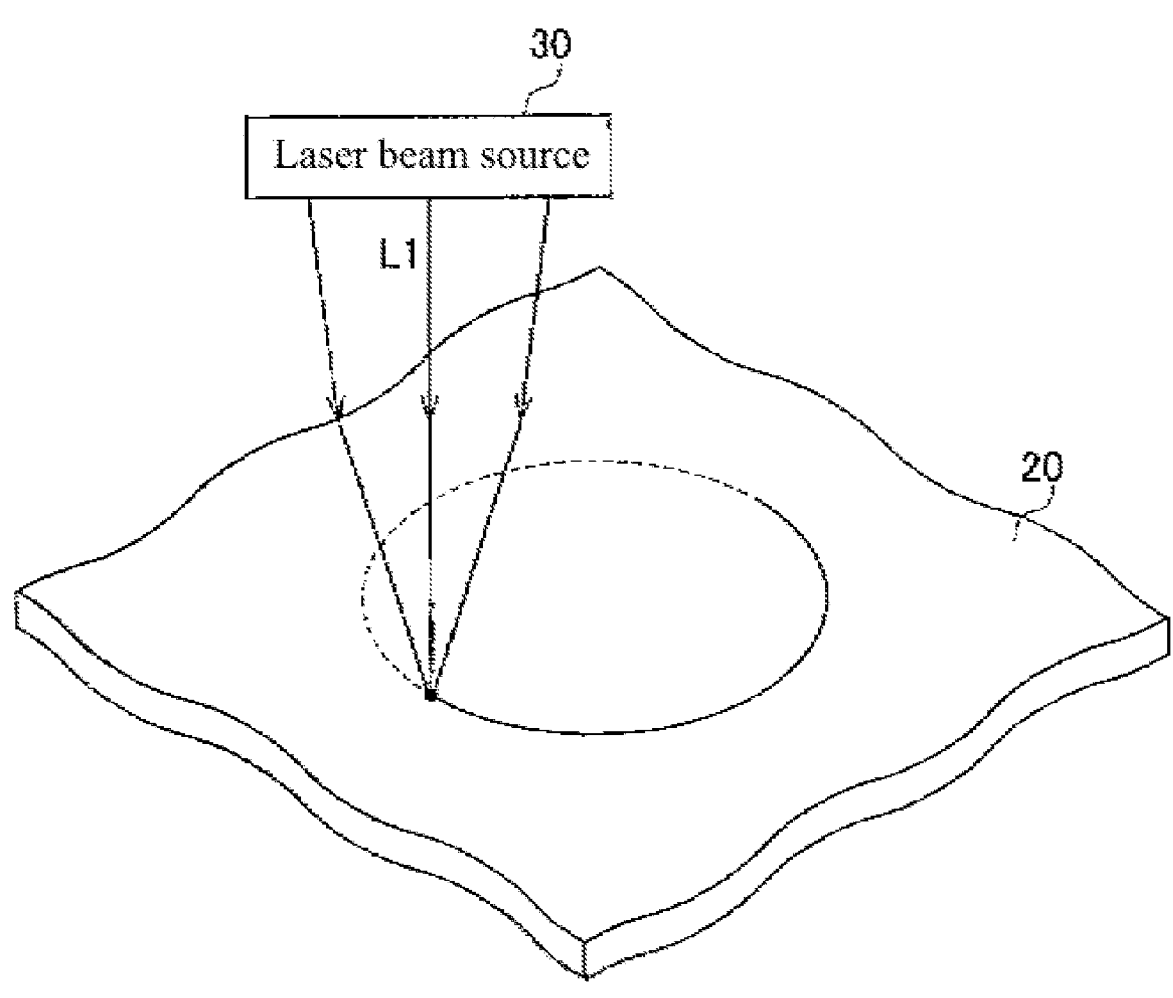
FIG. 2A is a diagram showing an example of a method for cutting out a glass blank from a glass plate according to the present embodiment.
Figure 2B:
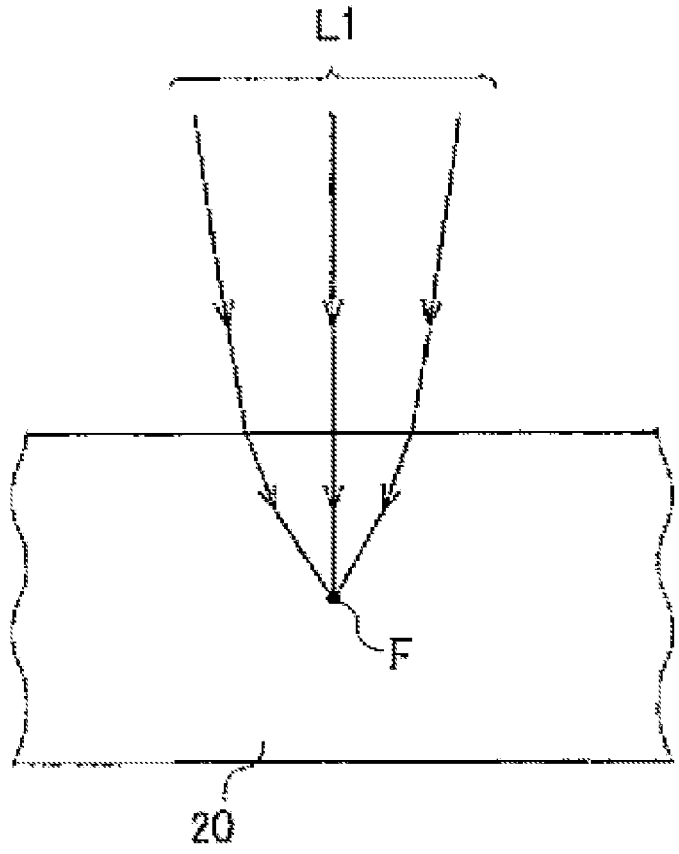
FIG. 2B is a diagram showing an example of the method for cutting out a glass blank from a glass plate according to the present embodiment.
Figure 3:
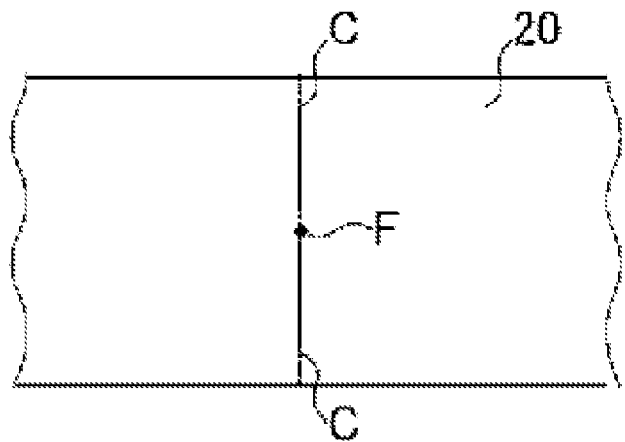
FIG. 3 is a diagram showing an example of the method for cutting out a glass blank from a glass plate according to the present embodiment.

In manufacture of such a glass substrate 1, separation processing for cutting out an annular glass blank from a glass plate, which is manufactured in advance, using the cutting laser beam is performed. FIGS. 2A, 2B, and 3 are diagrams showing separation processing for cutting out an annular glass blank from a glass plate 20 according to an embodiment. The glass plate 20 is a glass plate that is obtained using a floating method or a down draw method, for example, and has a thickness not larger than 0.6 mm. Alternatively, the glass plate 20 may also be obtained from a mass of glass through press molding using a mold. The thickness of the glass plate 20 is larger than a target thickness of a glass substrate for a magnetic disk, which is the end product, by an amount to be removed through grinding and polishing, which is about several tens of micrometers, for example.

A laser beam source 30 is an apparatus that emits a laser beam L1 (cutting laser beam), and a solid-state laser, such as a YAG laser or an ND:YAG laser, is used, for example. Accordingly, the wavelength of the laser beam L1 is in a range of 1030 nm to 1070 nm, for example. The laser beam L1 is a pulsed laser, and according to one embodiment, the pulse width of the laser beam L1 is preferably not larger than $10^{-12}$ seconds (not larger than 1 picosecond) in terms of suppressing excessive alteration of glass at a focal position F of the laser beam L1. Light energy of the laser beam L1 can be appropriately adjusted according to the pulse width and the repetition frequency of the pulse width. If light energy that is excessively high relative to the pulse width and the repetition frequency is provided, the glass is likely to be excessively altered and a residue is likely to remain at the focal position F. Through irradiation with the laser beam L1, defects can be formed intermittently at discrete positions.

In the example shown in FIG. 2B, an optical system of the laser beam source 30 is adjusted such that the focal position F of the laser beam L1 is located in an inner portion of the glass plate 20 in its thickness direction. Light energy concentrates at the focal position F and the focal position F is locally heated, and a crack starting portion (core in the generation of cracks) is formed through the formation of blemishes, melting, degradation, or alteration. The focal position F is moved relative to the glass plate 20 to form a circle when viewed from a surface of the glass plate 20, and therefore the crack starting portion is formed along a circular arc line. Cracks are generated due to the formation of the crack starting portion, and furthermore, the glass plate 20 is heated or irradiated with another laser beam as necessary to generate cracks C at respective positions in the crack starting portion inside the glass and cause the cracks C to develop toward the main surfaces as shown in FIG. 3. Furthermore, the cracks C develop to adjacent crack starting positions. Thus, a circular separation boundary line can be formed. In order to manufacture an annular glass blank including a circular hole at the center from the glass plate, two separation boundary lines, which are constituted by an outer circumferential circle portion and an inner circumferential circle portion, are formed.

Note that FIG. 3 shows an example, and a configuration is also possible in which the focal position F is not located inside the glass plate in its thickness direction. For example, the local position F may be located on a main surface of the glass plate 20.

A distance between adjacent defects among the defects intermittently formed in the glass plate 20 is about several micrometers, for example, 1 to 10 μm. After the separation boundary lines are formed, the glass blank is separated and taken out of the glass plate 20 using thermal expansion of the glass plate due to heating.

Figure 4:
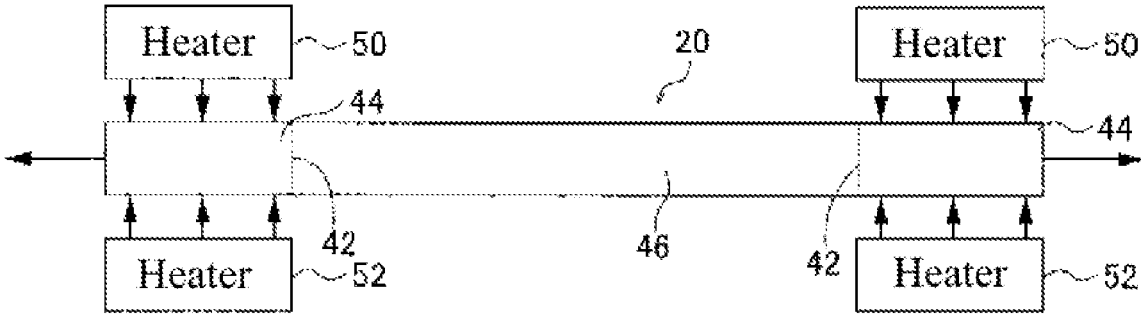
FIG. 4 is a diagram specifically showing heating of a glass plate used in a method for manufacturing a glass plate according to an embodiment.
Figure 5:
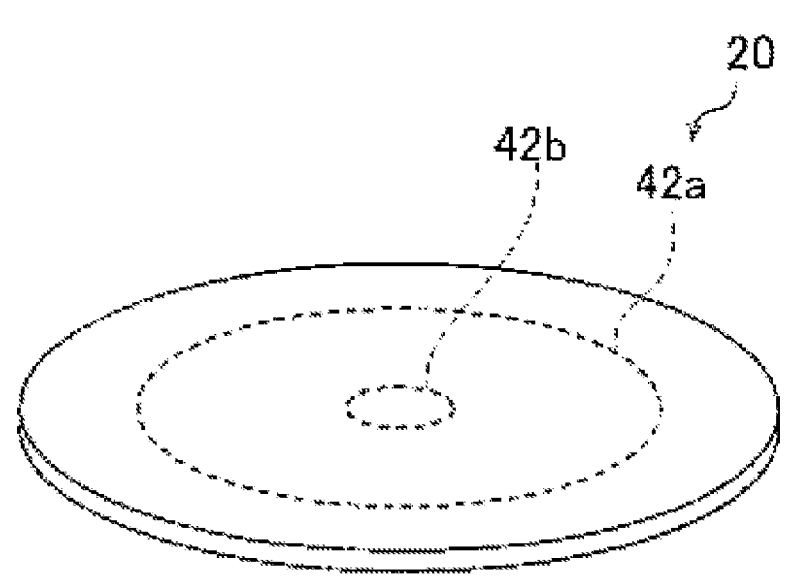
FIG. 5 is a diagram showing two separation boundary lines that are formed in the glass plate used in the method for manufacturing a glass plate according to an embodiment.

FIG. 4 is a diagram specifically showing heating of the glass plate 20, which is used to form an annular glass blank that is used in the method for manufacturing a annular glass plate according to an embodiment. FIG. 4 shows an example of a case where a portion of the glass plate 20 on the outer side of the separation boundary line of the outer circumferential circle portion of a circular shape is removed. FIG. 5 is a diagram showing two separation boundary lines formed in the glass plate 20 in the method for manufacturing a annular glass plate according to an embodiment.

When heating the glass plate 20, an outer portion 44 on the outer side of a separation boundary line 42 formed in the glass plate 20 is placed in a heating space between heaters 50 and 52, and an inner portion 46 is placed outside the heating space as shown in FIG. 4. Thus, the outer portion 44 can be heated. At this time, the outer portion 44 is heated more than the inner portion 46 is, and accordingly, the amount of thermal expansion of the outer portion 44 can be made larger than the amount of thermal expansion of the inner portion 46. As a result, thermal expansion of the outer portion 44 occurs outward as shown in FIG. 5. Therefore, a gap can be reliably formed at the interface between the outer portion 44 and the inner portion 46. Accordingly, the outer portion 44 and the inner portion 46 can be reliably separated from each other.

That is, by heating the outer portion 44 on the outer side of the separation boundary line 42a (FIG. 5) of the outer circumferential circle portion formed in the glass plate 20, it is possible to cause the outer portion 44 on the outer side of the outer circumferential circle portion of the glass plate 20 to thermally expand relatively largely compared to the inner portion 46 on the inner side of the outer circumferential circle portion, and separate the inner portion 46 and the outer portion 44 from each other to take out the inner portion 46 on the inner side of the outer circumferential circle portion.

Furthermore, by heating an outer portion 44 on the outer side of the separation boundary line 42b (FIG. 5) of the inner circumferential circle portion, it is possible to cause the outer portion 44 on the outer side of the inner circumferential circle portion of the glass plate 20 to thermally expand relatively largely compared to an inner portion 46 on the inner side of the inner circumferential circle portion, separate the inner portion 46 and the outer portion 44 from each other, and take out the outer portion 44 on the outer side of the inner circumferential circle portion to obtain an annular glass blank including a circular hole at the center.

Thus, an annular glass blank 28 (see FIG. 6) can be easily taken out of the glass plate 20 without applying a strong force to the glass plate 20.

Note that, according to one embodiment, it is preferable that the focal position F shown in FIG. 2B is located at a distance in a range of one third to two thirds of the thickness of the glass plate 20 from the main surface of the glass plate 20. If the focal position F is set in this range, a separation surface that has a roundness and a surface roughness approximate to target values can be formed, and accordingly, the necessity of additional edge surface polishing other than the laser polishing processing may be eliminated, and manufacturing efficiency can be improved.

According to one embodiment, it is also preferable that the focal position F is located at a distance that is shorter than one third of the thickness of the glass plate 20 from the main surface of the glass plate 20. In this case, a residue is likely to be formed and the surface roughness is impaired at the main surface of the glass plate 20, when compared to the separation surface, but the vicinity of the focal position F is removed through chamfering processing, which will be described later. Therefore, it is preferable that the focal position F is located at a distance that is shorter than one third of the thickness of the glass plate 20 from the main surface of the glass plate 20.

According to one embodiment, it is preferable that the laser beam L1 is a pulsed laser beam that has a pulse width not larger than $10^{-12}$ seconds. If the pulse width is larger than $10^{-12}$ seconds, the surface roughness is likely to be impaired as a result of light energy concentrating at the focal position F and the glass in the vicinity of the focal position F being altered.

When the annular glass blank 28 is taken out of the glass plate 20 by using the laser beam L1 (cutting laser beam) shown in FIG. 2A and heating the glass plate as shown in FIG. 4, it is preferable that edge surfaces (an inner circumferential edge surface and an outer circumferential edge surface) of the annular glass blank 28 have an arithmetic average surface roughness Ra not larger than 1 μm. If Ra is larger than 1 μm, the roughness may not be sufficiently reduced through subsequently performed laser polishing processing.

Laser polishing processing is performed on the edge surfaces (the inner circumferential edge surface and the outer circumferential edge surface) of the annular glass blank 28 (see FIG. 6) obtained by being separated from the glass plate 20 as described above. Specifically, chamfered surfaces are formed while edge surface polishing is performed using a laser beam L2 (edge-surface-polishing laser beam) of a different type from the laser beam L1. In this case, edge surface polishing is performed by irradiating the edge surfaces with the laser beam L2 while moving the annular glass blank 28 relative to the laser beam L2. Specifically, through the irradiation with the laser beam L2, it is possible to make molten surfaces in the inner circumferential edge surface and the outer circumferential edge surface have an arithmetic average surface roughness Ra not larger than 0.1 μm, and form chamfered surfaces at the same time.

Figure 6:
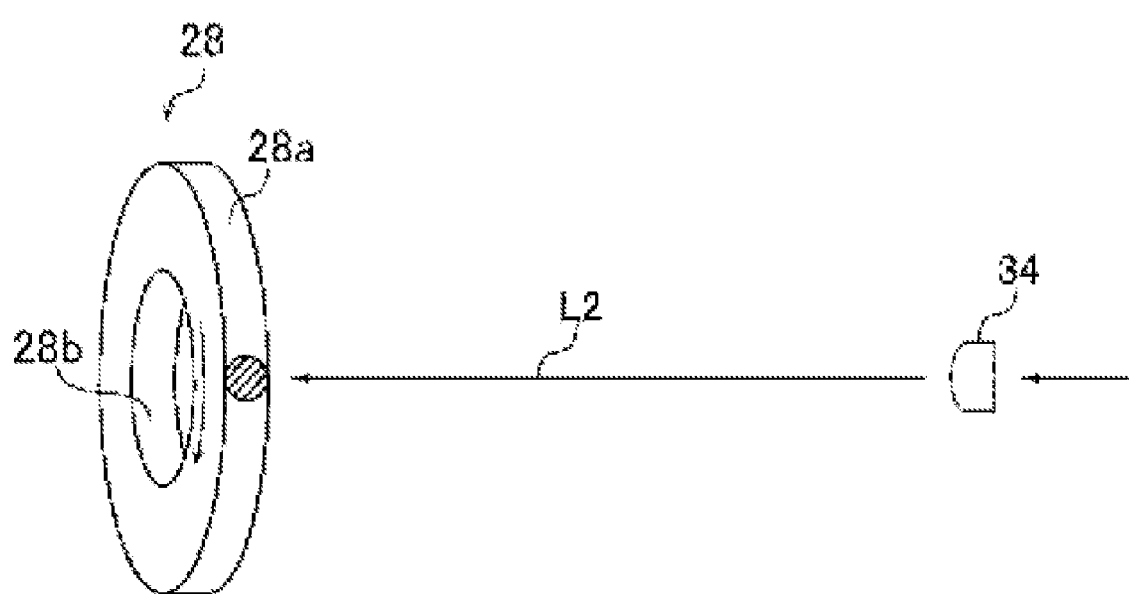
FIG. 6 is a diagram showing an example of edge surface polishing performed in the present embodiment.

FIG. 6 is a diagram showing an example of the edge surface polishing performed in the present embodiment. In the edge surface polishing shown in FIG. 6, the laser beam L2 is emitted to a separation surface from the normal direction of the separation surface to heat and melt a portion of glass in the vicinity of the separation surface through irradiation with the laser beam L2, and form chamfered surfaces in the separation surface. Therefore, the surface roughness of the separation surface can be reduced and the roundness can be increased through the irradiation with the laser beam L2. By appropriately setting the intensity and a spot diameter of the laser beam L2, it is possible to reduce the surface roughness of the separation surface and improve the roundness while forming the chamfered surfaces. Accordingly, the laser beam L2 is an edge-surface-polishing laser beam.

The laser beam L2 is emitted from a laser beam source, formed into a parallel beam while being passed through an optical system that includes a collimator etc., then caused to converge using a converging lens 34, and then emitted to the separation surface while spreading after converging. On the other hand, the annular glass blank 28 is rotated about the center position of the annular glass blank 28 at a constant speed. Thus, the entire circumference of the separation surface of the annular glass blank 28 is irradiated with the laser beam L2 while the laser beam L2 and the separation surface are moved relative to each other in the circumferential direction of the annular glass blank 28. Here, the laser beam L2 is emitted to the separation surface from the normal direction of the separation surface to be irradiated, and the normal direction includes, as allowable tolerances, directions that are inclined at an inclination angle of 0±10° with respect to the normal direction, in addition to the exact normal direction (inclination angle: 0°). Furthermore, the direction in which the laser beam L2 is emitted may be inclined at an inclination angle of 0±45° with respect to the normal direction, outside the range of inclination angle of 0±10°.

In the example shown in FIG. 6, chamfered surfaces are formed in a separation surface that is the outer circumferential edge surface 28*a* of the glass blank 28, and furthermore, chamfered surfaces are formed in a separation surface that is the inner circumferential edge surface 28*b* defining a circular hole provided at the center of the annular glass blank 28. Glass in the vicinity of the separation surfaces irradiated with the laser beam L2 is softened and melted, and accordingly, the separation surfaces become molten surfaces including the chamfered surfaces. Furthermore, the molten surfaces in the outer inner circumferential edge surface and the inner circumferential edge surface of an annular glass plate that is formed from the annular glass blank 28 can each have an arithmetic average surface roughness Ra not larger than 0.1 μm.

At this time, the laser beam L2 emitted to the outer circumferential edge surface 28*a* and the inner circumferential edge surface 28*b* preferably has a cross-sectional intensity distribution of a single mode. That is, the cross-sectional intensity distribution of the laser beam L2 is a Gaussian distribution. When the width of the laser beam L2 at irradiated positions on the outer circumferential edge surface 28*a* and the inner circumferential edge surface 28*b* (in FIG. 6, the hatched area in the outer circumferential edge surface 28*a*) in the thickness direction of the annular glass blank 28 is represented by W1 [mm], the thickness of the annular glass blank 28 is represented by Th [mm], and the power density of the laser beam L2 is represented by Pd [W/mm²], it is preferable to perform irradiation with the laser beam L2 under conditions that W1>Th and Pd×Th is 0.8 to 3.5 [W/mm]. Here, the laser beam L2 is emitted so as to extend from both sides of the annular glass blank 28 in the thickness direction. By making the widths by which the laser beam L2 extends from both sides of the outer circumferential edge surface 28*a* and the inner circumferential edge surface 28*b* equivalent, it is possible to uniformly perform chamfering on both sides in the thickness direction of the annular glass blank 28 and make the shapes of the two chamfered surfaces equivalent. The power density Pd is a value obtained by dividing a whole power P [W] of the laser beam L2 by the area of the beam in a portion irradiated with the laser beam L2. When the laser beam L2 has an elliptical shape with a minor axis radius of W1/2 and a major axis radius of W2/2, the power density Pd is defined as 4×P/W1/W2/π [W/mm²] (π represents the ratio of a circle's circumference to its diameter).

It is possible to set the width W1 and the length W2 of the beam by adjusting the position on the annular glass blank 28 irradiated with the laser beam L2 using two cylindrical lenses, for example. The width W1 can be determined using a beam profiler, and the length W2 can be determined based on a beam shape obtained using the beam profiler and the diameter D of the glass plate.

By making the width W1 of the laser beam L2 larger than the thickness Th of the annular glass blank 28, it is possible to sufficiently irradiate edges on the main surface sides (both sides in the thickness direction) of the outer circumferential edge surface 28*a* and the inner circumferential edge surface 28*b* with the laser beam L2 to soften and melt portions of the annular glass blank 28 by heat and form the chamfered surfaces.

If the ratio Th/W1 of the width W1 of the laser beam L2 to the thickness Th of the annular glass blank 28 is too large (i.e., if Th/W1 is too close to 1), heating of edge portions of the annular glass blank 28 becomes weak and heating of center portions in the thickness direction of the outer circumferential edge surface 28*a* and the inner circumferential edge surface 28*b* of the annular glass blank 28 is intensified due to the influence of regions where the slope of the intensity distribution of the laser beam L2 is steep. Accordingly, the outer circumferential edge surface 28*a* and the inner circumferential edge surface 28*b* are likely to have spherical surface shapes, which is not preferable. If Th/W1 is too small, heating of the outer circumferential edge surface 28a and the inner circumferential edge surface 28b with the laser beam L2 becomes too weak and it may be difficult to form the chamfered surfaces. From the standpoints described above, Th/W1 is preferably within a range of 0.3 to 0.9.

On the other hand, if the power density Pd of the laser beam L2 is too low, the outer circumferential edge surface 28a and the inner circumferential edge surface 28b are not sufficiently heated and the chamfered surfaces are not formed. On the other hand, if the power density Pd is too high, the entire outer circumferential edge surface 28a and the entire inner circumferential edge surface 28b are rounded into spherical shapes, and lengths of the spherical shapes in the thickness direction becomes larger than the thickness Th of the annular glass blank 28.

Therefore, it is preferable to perform the irradiation under the conditions that W1>Th and Pd×Th=0.8 to 3.5 [W/mm]. Pd×Th is preferably not larger than 3.0 [W/mm], more preferably 1.0 to 2.8 [W/mm], and further preferably 1.2 to 2.3 [W/mm].

When the thickness Th of the annular glass blank 28 is thin and irradiation conditions do not satisfy Pd×Th=0.8 to 3.5 [W/mm], the power density Pd is increased to satisfy Pd×Th=0.8 to 3.5 [W/mm]. By increasing the power density Pd, it is possible to compensate for a reduction in the area of the annular glass blank 28 irradiated with the laser beam L2, with the power density Pd, and form the chamfered surfaces. Note that in order to simultaneously form chamfered surfaces having the same shape on both sides in the thickness direction of the annular glass blank 28, it is preferable to adjust the center position in the width direction of the laser beam L2 to the center position in the thickness direction of the annular glass blank 28.

When irradiation with the laser beam L2 is performed as described above, the outer circumferential edge surface 28a and the inner circumferential edge surface 28b of the annular glass blank 28 can be kept from deviating from target shapes and can be formed into the target shapes, and the chamfered surfaces can be formed. Moreover, the outer circumferential edge surface 28a and the inner circumferential edge surface 28b can be made smooth.

Although the chamfered surfaces can be formed limiting the range of the value of Pd×Th as described above, it is possible to efficiently form the chamfered surfaces in the outer circumferential edge surface 28a and the inner circumferential edge surface 28b of the annular glass blank 28 by irradiating the outer circumferential edge surface 28a and the inner circumferential edge surface 28b with the laser beam L2 while controlling the value of Pd×Th and a movement speed of the laser beam L2 relative to the glass blank 28. Also, it is possible to form not only the chamfered surfaces but also a surface that is perpendicular to the main surfaces of the annular glass blank 28, i.e., a side wall surface 11w by controlling the value of Pd×Th and the movement speed more precisely. Thus, the outer circumferential edge surface 28a and the inner circumferential edge surface 28b can be formed into the target shapes without deviating from the target shapes. Moreover, the outer circumferential edge surface 28a and the inner circumferential edge surface 28b can be made smooth. In this case, before the chamfered surfaces are formed, the outer circumferential edge surface 28a and the inner circumferential edge surface 28b of the annular glass blank 28 include surfaces that are perpendicular to the main surfaces, at least in center portions in the thickness direction of the annular glass blank 28. By irradiating the outer circumferential edge surface 28a and the inner circumferential edge surface 28b of the annular glass blank 28 with the laser beam L2, it is possible to soften and/or melt edge portions on both sides in the thickness direction of the outer circumferential edge surface 28a and the inner circumferential edge surface 28b (i.e., boundary portions between the main surfaces and the outer circumferential edge surface 28a and the inner circumferential edge surface 28b), for example, right-angled corner portions of the annular glass blank 28 to chamfer the edge portions of the outer circumferential edge surface 28a and the inner circumferential edge surface 28b into rounded shapes, and to form surfaces (side wall surfaces 11w) that are sandwiched between the chamfered surfaces on both sides in the thickness direction of the annular glass blank 28 and perpendicular to the main surfaces, in the chamfered outer circumferential edge surface 28a and the chamfered inner circumferential edge surface 28b. In particular, it is preferable that the outer circumferential edge surface 28a and the inner circumferential edge surface 28b each include the chamfered surfaces and a surface (side wall surface 11w) that is perpendicular to the main surfaces and has a length of at least one tenth of the thickness Th. The length of the perpendicular surface (side wall surface 11w) is more preferably at least one fifth of the thickness Th of the annular glass blank 28.

According to an embodiment, the perpendicular surface (side wall surface 11w shown in FIG. 1B) formed together with the chamfered surfaces through irradiation with the laser beam L2 differs from surfaces in the outer circumferential edge surface 28a and the inner circumferential edge surface 28b, which are perpendicular to the main surfaces and are present before the chamfered surfaces are formed through the irradiation with the laser beam L2, and is a newly formed surface, that is, a molten surface, and the surface roughness Rz and the arithmetic average roughness Ra decrease due to the irradiation with the laser beam L2. Also, a distance in a radial direction from the center position of the annular glass blank 28 to the perpendicular surface (side wall surface 11w) increases.

Note that an allowable range of the surface (side wall surface 11w) perpendicular to the main surfaces of the annular glass blank 28 is 90±2° with respect to the main surfaces.

According to an embodiment, in the target shapes of the outer circumferential edge surface 28a and the inner circumferential edge surface 28b, when the length of the chamfered surface 11c (see FIG. 1B, including a curved chamfered surface) in a radial direction of the main surface 12 is represented by C, it is preferable that the irradiation condition Pd×Th is set such that the ratio C/Th of the length C to the thickness Th becomes 0.1 to 0.7. When C/Th is 0.1 to 0.7, a chamfered surface 11c that does not include corner portions at connection portions between the chamfered surface 11c and the main surfaces 11p and 12p can exhibit its function. When C/Th is less than 0.1, the chamfered surface 11c is not sufficiently formed and there is a risk that an edge will be likely to be chipped in a subsequent film formation step or the like. Also, when C/Th is more than 0.7, there is a risk that data recording areas on the main surfaces 11p and 12p will be reduced. Accordingly, C/Th can be adjusted by adjusting Pd×Th within a range of 1.2 to 2.3 [W/mm]. C/Th is more preferably 0.25 to 0.5.

According to an embodiment, in the target shapes of the outer circumferential edge surface 28a and the inner circumferential edge surface 28b, when the length of the side wall surface 11w (see FIG. 1B) in the thickness direction is represented by T [mm], it is preferable to set the irradiation conditions such that the ratio T/Th of the length T to the thickness Th becomes 0.1 to 0.8. When T/Th is less than 0.1, the side wall surface 11$w$ is not sufficiently formed and outer diameters or inner diameters of the annular glass blank 28 and the glass substrate 1 for a magnetic disk are difficult to measure, and accordingly, there is a risk that measurement variation will occur and production management will be difficult. Also, when T/Th is more than 0.8, the chamfered surfaces 11$c$ and 12$c$ are not sufficiently formed, and there is a risk that edges will be likely to be chipped in the subsequent film formation step in which magnetic films are formed, for example.

Also, when shape processing is performed by moving an irradiation position of the laser beam L2 relative to the annular glass blank 28 in the circumferential direction of the annular glass blank 28 as shown in FIG. 6, it is preferable to make the length W2 of the laser beam L2 in the circumferential direction at the irradiation position (in FIG. 6, the length in the circumferential direction of the hatched area in the outer circumferential edge surface 28$a$) long to some extent to effectively heat the outer circumferential edge surface 28$a$ and the inner circumferential edge surface 28$b$ with the laser beam L2 by gradually raising temperatures of the outer circumferential edge surface 28$a$ and the inner circumferential edge surface 28$b$ with the laser beam L2 such that the temperatures reach the maximum at the center point in the circumferential direction of the irradiation position. In this case, the movement speed at the irradiation position of the laser beam L2 can be increased, and therefore, a processing time can be reduced. According to an embodiment, the ratio W2/D of the length W2 of the laser beam L2, with which the outer circumferential edge surface 28$a$ and the inner circumferential edge surface 28$b$ are irradiated, in the circumferential direction of the annular glass blank 28 to the diameter D of the annular glass blank 28 is preferably 0.03 to 0.2. When W2/D is less than 0.03, the length W2 is relatively short and not long enough to gradually raise the temperatures of the outer circumferential edge surface 28$a$ and the inner circumferential edge surface 28$b$. When W2/D is more than 0.2, the length W2 is relatively long, and in this case, the irradiation position of the laser beam L2 on the annular glass blank 28 (position in the direction in which the laser beam L2 is emitted) significantly varies depending on the curvature of the annular glass blank 28, and consequently, the beam spreads and it becomes difficult to efficiently heat the edge surfaces in the circumferential direction. According to an embodiment, the laser beam L2 with which the outer circumferential edge surface 28$a$ and the inner circumferential edge surface 28$b$ are irradiated preferably has an elliptical shape.

Note that when the power density Pd is gradually increased in the irradiation with the laser beam L2, the diameter of the annular glass blank 28 increases by several tens of micrometers to several hundred micrometers as a result of the shapes of the outer circumferential edge surface 28$a$ and the inner circumferential edge surface 28$b$ being rounded, and when the power density Pd is further increased, wider areas in the edge surfaces are rounded and their length in the thickness direction increases, with the shapes of the edge surfaces becoming spherical surface shapes, and as a result, the diameter of the annular glass blank 28 decreases. That is, the diameter of the annular glass blank 28 after the formation of the chamfered surfaces varies depending on the power density Pd. It is not preferable that the outer diameter of the annular glass blank 28 becomes smaller than a target diameter of the annular glass blank 28. Also, when the outer circumferential edge surface 28$a$ and the inner circumferential edge surface 28$b$ are excessively heated, spherical surface shapes are likely to vary, and the diameter of the annular glass blank 28 cannot be made constant, which is not preferable. Therefore, it is preferable to set the power density Pd such that the diameter of the annular glass blank 28 formed by being irradiated with the laser beam L2 becomes larger than the diameter of the annular glass blank 28 before being irradiated with the laser beam L2.

The movement speed of the laser beam L2 moving along the outer circumferential edge surface 28$a$ and the inner circumferential edge surface 28$b$ is preferably 0.7 to 140 mm/second. Here, the movement speed is the speed of movement relative to the outer circumferential edge surface 28$a$ and the inner circumferential edge surface 28$b$. From the standpoint of processing efficiency, it is preferable that chamfering processing for forming the chamfered surfaces using the laser beam L2 is completed in a single turn of the laser beam L2 around the annular glass blank 28. Here, if the movement speed is higher than 140 mm/second, it is difficult to measure the timing at which the processing is completed, and there is a risk that it will be difficult to make the end point of the processing match the start point. Also, when the movement speed is lower than 0.7 mm/second, the shapes of the outer circumferential edge surface 28$a$ and the inner circumferential edge surface 28$b$ vary due to a slight change in Pd×Th, and accordingly, it is difficult to control the shapes of the outer circumferential edge surface 28$a$ and the inner circumferential edge surface 28$b$. For example, even if the side wall surface 11$w$ and the chamfered surfaces 11$c$ and 12$c$ have target shapes, when Pd×Th is increased only by a small amount, the outer circumferential edge surface 28$a$ and the inner circumferential edge surface 28$b$ are excessively heated and are likely to have the spherical surface shapes described above, and therefore, it is difficult to stably manufacture the annular glass plate. For these reasons, the movement speed is preferably 0.7 to 140 mm/second.

The movement speed is more preferably 20 to 140 mm/second. When the movement speed is at least 20 mm/second, variation in the shapes of the outer circumferential edge surface 28$a$ and the inner circumferential edge surface 28$b$ due to a change in Pd×Th is relatively moderate, and productivity is improved due to a reduction in the processing time. Therefore, the movement speed is more preferably 20 to 100 mm/second.

Note that when the edge surface polishing is performed using the laser beam L2, the temperature of the annular glass blank 28 is preferably made higher than room temperature in order to facilitate the edge surface polishing performed using the laser beam L2. At this time, the temperature is preferably not higher than Tg-50° (Tg represents the glass transition temperature of the annular glass blank 28). Furthermore, the temperature of the annular glass blank 28 during chamfering processing is more preferably within a range of 150° C. to 400° C. When the temperature of the annular glass blank 28 is lower than 150° C., the chamfered surfaces may not be sufficiently formed. When the temperature of the annular glass blank 28 is higher than 400° C., the annular glass blank 28 may deform and it may become difficult to irradiate the outer circumferential edge surface 28$a$ and the inner circumferential edge surface 28$b$ with the laser beam L2. The annular glass blank 28 can be heated before the chamfered surfaces are formed, or while the chamfered surfaces are formed, for example. When the annular glass blank 28 is heated using a laser beam, an irradiation spot diameter of the laser beam is not particular limited, but is preferably at least ¾ of the diameter of the annular glass blank 28 in terms of increasing heating efficiency. The main surfaces may be scanned with the laser beam for heating, or a plurality of laser beams may be used for heating. A $CO_2$ laser can be used as the laser beam for heating, for example. Commonly, 99% or more of a $CO_2$ laser beam is absorbed by glass, and therefore, the glass blank 28 can be efficiently heated.

Note that when the annular glass blank 28 is heated while chamfering is performed through irradiation with the laser beam L2, it is difficult to control the temperature due to a synergic effect of the heating performed with the laser beam L2, and therefore, significant variation may occur in the shapes of the outer circumferential edge surface 28a and the inner circumferential edge surface 28b. Therefore, when the annular glass blank 28 is heated, it is preferable to heat the annular glass blank 28 in advance of the chamfering processing performed using the laser beam L2. In this case, it is preferable to keep the annular glass blank 28 hot as appropriate during chamfering.

When molten surfaces are formed in the inner circumferential edge surface 28b and the outer circumferential edge surface 28a using the above-described irradiation conditions of the laser beam L2 and the above-described rotation conditions of the annular glass blank 28, if the same conditions are used for the inner circumferential edge surface 28b and the outer circumferential edge surface 28a, the inner circumferential edge surface 28b is likely to be formed into a spherical surface shape, and a bulge shape that bulges relative to the main surfaces is likely to be formed on the inner circumferential side of the main surfaces. The reason why the bulge shape is likely to be generated on the inner circumferential side of the main surfaces is presumed to be that a movement speed of the laser beam L2 relative to the inner circumferential edge surface 28b is lower than a movement speed of the laser beam L2 relative to the outer circumferential edge surface 28a, and the inner circumferential edge surface 28b is excessively irradiated with the laser beam L2.

Figure 7A:
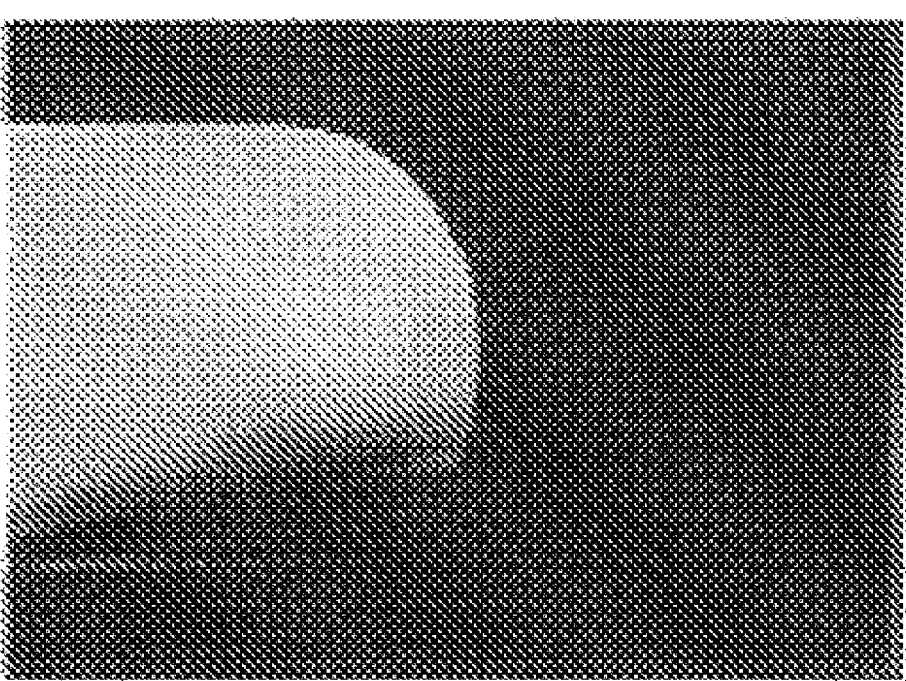
FIG. 7A is a diagram showing an example of the shape of an inner circumferential edge surface of an annular glass plate manufactured using the method for manufacturing a glass plate according to an embodiment.
Figure 7B:
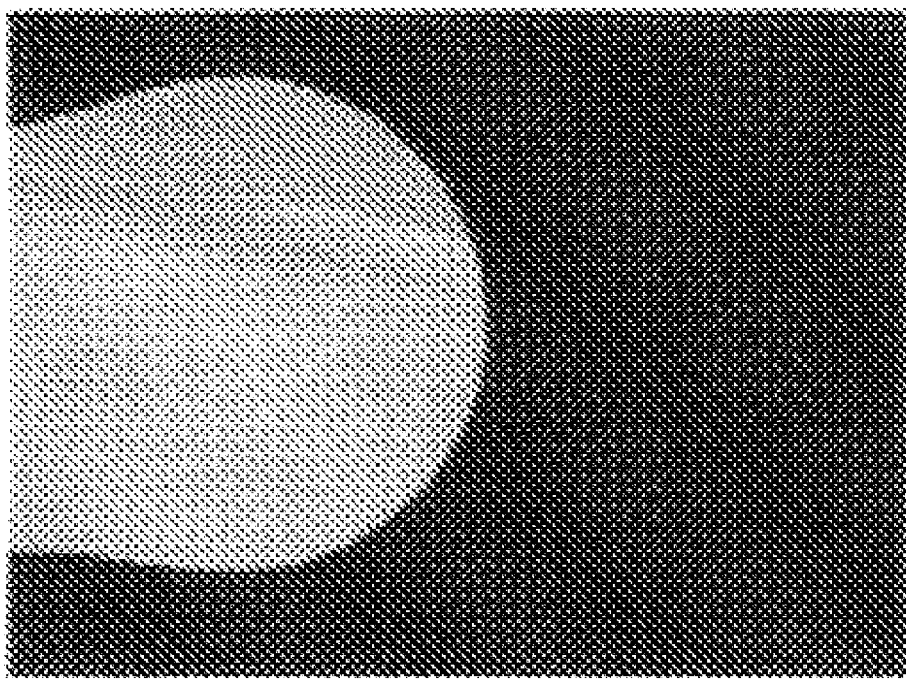
FIG. 7B is a diagram showing an example of the shape of an inner circumferential edge surface of an annular glass plate manufactured using a conventional method for manufacturing a glass plate.

FIG. 7A is a diagram showing an example of the shape of the inner circumferential edge surface 28b that does not include a bulge shape, in an annular glass plate manufactured using the method for manufacturing a glass plate according to an embodiment. FIG. 7B is a diagram showing an example of the shape of the inner circumferential edge surface 28b that includes a bulge shape, in an annular glass plate manufactured using a conventional method for manufacturing a glass plate. As shown in FIG. 7B, the inner circumferential edge surface 28b having a spherical surface shape bulges from the main surfaces in the thickness direction. Therefore, the annular glass plate cannot be stably arranged horizontally when both main surfaces of the glass plate are ground or polished after the edge surface polishing, and a problem may occur such as nonuniformity of the processing performed on the main surfaces or the annular glass plate jutting out from a holding carrier that holds the annular glass plate while both main surfaces are ground or polished.

Therefore, in order that the bulge shape will not be generated in the inner circumferential edge surface, irradiation conditions of the laser beam L2 and rotation conditions of the annular glass blank 28 are changed from irradiation conditions and rotation conditions that are used when the outer circumferential edge surface is irradiated with the laser beam L2.

In this case, an inner circumferential edge surface that does not include a bulge shape can be formed with various settings of the conditions, but the surface roughness of the molten surface in the inner circumferential edge surface becomes larger than the surface roughness of the molten surface in the outer circumferential edge surface. Reasons for this are not clear, but are presumed to be that when the inner circumferential edge surface 28b is irradiated with the laser beam L2, the irradiated surface has a concave shape when viewed in the direction in which the laser beam L2 is emitted, and heat accumulates more easily in the inner circumferential edge surface 28b than in the outer circumferential edge surface 28a because the inner circumferential edge surface 28b is irradiated with the laser beam L2 in a space that is approximate to a closed space when compared to the case where the outer circumferential edge surface 28a is irradiated with the laser beam L2, and as a result, the shape of the inner circumferential edge surface 28b easily becomes a spherical shape. Specifically, when the inner circumferential edge surface 28b is formed so as to have a shape equivalent to the shape of the molten surface in the outer circumferential edge surface 28a, the shape of the inner circumferential edge surface 28b easily becomes a spherical surface shape. The inventor of the present application found that, when molten surfaces having an arithmetic average roughness Ra not larger than 0.1 μm are formed in the inner circumferential edge surface 28b and the outer circumferential edge surface 28a, if the surface roughness of the molten surface in the inner circumferential edge surface 28b is adjusted to be larger than the surface roughness of the molten surface in the outer circumferential edge surface 28a, the shape of the molten surface in the inner circumferential edge surface 28b can be kept from becoming a spherical surface shape.

Therefore, in the present embodiment, the annular glass plate is manufactured by performing irradiation with the laser beam L2 such that the surface roughness of the molten surface in the inner circumferential edge surface 28b is larger than the surface roughness of the molten surface in the outer circumferential edge surface 28a. In the laser polishing processing, the arithmetic average roughness Ra of the inner circumferential edge surface 28b is preferably made larger than the arithmetic average roughness Ra of the outer circumferential edge surface by at least 0.01 μm. In this case, it is possible to suppress generation of a bulge on the inner circumferential side of the main surfaces.

According to an embodiment, a power density Pd of the laser beam L2 emitted to the inner circumferential edge surface 28b is preferably not higher than 80% of a power density Pd of the laser beam L2 emitted to the outer circumferential edge surface 28a. In this case, in order to form the same shape as the shape of the outer circumferential edge surface 28a in the inner circumferential edge surface 28b, it is preferable that conditions other than the power density Pd are the same as conditions of the case where the outer circumferential edge surface is irradiated with the laser beam L2. When the power density Pd of the laser beam L2 emitted to the inner circumferential edge surface 28b is higher than 80% of the power density Pd of the laser beam L2 emitted to the outer circumferential edge surface 28a, the inner circumferential edge surface 28b is likely to be formed into a spherical surface shape and a bulge shape is likely to be generated.

Therefore, according to an embodiment, an annular glass plate can be manufactured by irradiating the outer circumferential edge surface 28a and the inner circumferential edge surface 28b of the annular glass blank 28 with the laser beam L2 to melt the outer circumferential edge surface 28a and the inner circumferential edge surface 28b and form molten surfaces, such that the molten surfaces in the outer circumferential edge surface 28a and the inner circumferential edge surface 28*b* each have an arithmetic average surface rough-ness Ra not larger than 0.1 μm and the power density Pd of the laser beam L2 emitted to the inner circumferential edge surface 28*b* is not higher than 80% of the power density Pd of the laser beam L2 emitted to the outer circumferential edge surface 28*a*.

According to an embodiment, it is preferable to irradiate the inner circumferential edge surface 28*b* and the outer circumferential edge surface 28*a* of the annular glass blank 28 with the laser beam L2 such that the inner circumferential edge surface and the outer circumferential edge surface of the annular glass plate do not bulge relative to both main surfaces of the annular glass plate.

Also, according to an embodiment, the molten surfaces of the annular glass plate formed through the irradiation with the laser beam L2 preferably have an arithmetic average surface roughness Ra not larger than 0.1 μm, and more preferably not larger than 0.05 μm. Also, the roundness is preferably not larger than 15 μm. The roundness is prefer-ably 0.1 to 15 μm. In this case, it is possible to reduce portions to be removed through additional edge surface polishing other than the laser polishing processing per-formed using the laser beam L2 from the edge surfaces of the annular glass plate, from which a glass substrate for a magnetic disk is to be formed, or the need for additional edge surface polishing can be eliminated. Therefore, the time it takes to perform edge surface polishing can be significantly reduced compared to that required in conven-tional technologies.

The roundness is preferably not larger than 10 μm, more preferably not larger than 7 μm, and further preferably not larger than 5 μm. With such separation surfaces, it is possible to easily form molten surfaces that satisfy requirements for edge surfaces of a glass substrate for a magnetic disk. Therefore, the edge surfaces need not be polished.

Although a $CO_2$ laser beam is used as an example of the laser beam L2, the laser beam L2 is not limited to the $CO_2$ laser beam and only required to have an oscillation wave-length that can be absorbed by glass. For example, a CO laser (oscillation wavelength: up to 5 μm or up to 10.6 μm), an Er-YAG laser (oscillation wavelength: up to 2.94 μm), etc., can be used. When a $CO_2$ laser beam is used, the wavelength is preferably at least 3 μm. Furthermore, the wavelength is more preferably not longer than 11 μm. When the wavelength is shorter than 3 μm, glass absorbs less laser beam L, and the outer circumferential edge surface 28*a* and the inner circumferential edge surface 28*b* of the annular glass blank 28 may not be sufficiently heated. When the wavelength is longer than 11 μm, it may be difficult to obtain a laser apparatus. Note that the oscillation manner of the laser beam L2 is not particularly limited, and the laser beam L2 may be any of continuous oscillation light (CW light), pulsed oscillation light, and modulated radiation of continu-ous oscillation light. However, if the laser beam L2 is pulsed oscillation light or modulated radiation of continuous oscil-lation light, there is a risk that the shape of the chamfered surfaces will not be uniform in the movement direction when the relative movement speed of the laser beam L2 is high. In this case, the frequency of oscillation and modula-tion is preferably at least 1 kHz, more preferably at least 5 kHz, and further preferably at least 10 kHz. Note that the power of the laser beam L2 can be determined as appropri-ate, but is not larger than 500 W, for example.

The above-described processing is effective for an extremely thin annular glass blank 28 that has a thickness not larger than 0.6 mm because the thinner the annular glass blank 28 is, the easier it is to melt glass in the vicinity of the separation surfaces in a short time by irradiating the sepa-ration surfaces with the laser beam L2. In this case, the glass substrate for a magnetic disk preferably has a thickness smaller than 0.52 mm after grinding/polishing processing, which will be described later.

In the embodiment described above, defects are intermit-tently formed along substantially concentric circles by irra-diating the glass plate 20 having a thickness not larger than 0.6 mm with the laser beam L1 (cutting laser beam), and the circular separation boundary lines 42, which are line-shaped defects constituted by the inner circumferential circle por-tion and the outer circumferential circle portion, are formed on the main surface of the glass plate 20 by connecting the defects. Furthermore, the inner portion 46 on the inner side of the outer circumferential circle portion of the glass plate 20 and the outer portion 44 on the outer side of the outer circumferential circle portion are separated from each other by heating the outer portion 44 on the outer side of the outer circumferential circle portion to cause the outer portion 44 to thermally expand relatively largely compared to the inner portion 46. Furthermore, the outer portion 44 on the outer side of the inner circumferential circle portion of the glass plate 20 and the inner portion 46 on the inner side of the inner circumferential circle portion are separated from each other by heating the outer portion 44 on the outer side of the inner circumferential circle portion to cause the outer por-tion 44 to thermally expand relatively largely compared to the inner portion 46. Thereafter, separation surfaces of the annular glass blank 28 obtained by removing the outer portion 44 on the outer side of the outer circumferential circle portion and the inner portion 46 on the inner side of the inner circumferential circle portion from the glass plate 20 are irradiated with the laser beam L2 (edge-surface-polishing laser beam) of a different type from the laser beam L1 to perform edge surface polishing on the outer circum-ferential edge surface 28*a* and the inner circumferential edge surface 28*b*, and therefore, productivity of the annular glass plate can be significantly increased.

Main Surface Grinding/Polishing Processing

Grinding/polishing processing is performed on the main surfaces of the annular glass plate that is obtained by performing the edge surface polishing on the annular glass blank 28. In the grinding/polishing processing, the annular glass plate is ground and then polished. In grinding process-ing, grinding is performed on the main surfaces of the annular glass plate using a double-side grinding apparatus provided with a planetary gear mechanism. Specifically, both main surfaces of the annular glass plate are ground while the outer circumferential edge surface of the annular glass plate is held in a holding hole provided in a holding member of the double-side grinding apparatus. The double-side grinding apparatus has a pair of upper and lower surface plates (an upper surface plate and a lower surface plate), and the annular glass plate is sandwiched between the upper surface plate and the lower surface plate. The annular glass plate and the surface plates are moved relative to each other by moving one or both of the upper surface plate and the lower surface plate while supplying a coolant, and thereby both main surfaces of the annular glass plate can be ground. The grinding processing can be performed in a state in which grinding members obtained by forming fixed abrasive par-ticles, which are obtained by fixing diamonds using resin, into a sheet-shape are attached to the surface plates, for example. Through the grinding processing described above, the main surfaces can be formed into ground surfaces.

Next, first polishing is performed on the ground main surfaces of the annular glass plate. Specifically, both main surfaces of the annular glass plate are polished while the outer circumferential edge surface of the annular glass plate is held in a holding hole provided in a carrier for polishing of a double-side polishing apparatus. The first polishing is for removing blemishes and warping or adjusting minute surface unevenness (microwaviness, roughness) remaining on the main surfaces after the grinding processing.

In the first polishing processing, the main surfaces of the annular glass plate are polished using the double-side polishing apparatus having a configuration similar to that of the double-side grinding apparatus used in the above-described grinding processing with fixed abrasive particles, while a polishing slurry is provided. In the first polishing processing, a polishing slurry containing loose abrasive particles is used. Cerium oxide abrasive particles, zirconia abrasive particles, etc., are used as the loose abrasive particles in the first polishing, for example. Similarly to the double-side grinding apparatus, the double-side polishing apparatus sandwiches the annular glass plate between a pair of upper and lower surface plates. Tabular polishing pads (resin polisher, for example) having an annular shape overall are attached to the upper surface of the lower surface plate and the bottom surface of the upper surface plate. The annular glass plate and the surface plates are moved relative to each other by moving one or both of the upper surface plate and the lower surface plate, and thereby both main surfaces of the annular glass plate are polished. It is preferable that abrasive polishing particles have an average particle diameter (D50) in a range of 0.5 to 3 μm.

After the first polishing, the annular glass plate may be chemically strengthened. In this case, a melt in which potassium nitrate and sodium nitrate are mixed, for example, is used as a chemical strengthening liquid, and the annular glass plate is immersed in the chemical strengthening liquid. Thus, a compressive stress layer can be formed on the surface of the annular glass plate through ion exchange.

Next, second polishing is performed on the annular glass plate. The second polishing processing is for mirror-polishing the main surfaces. Through the second polishing processing, it is possible to make the main surfaces of the annular glass plate have an arithmetic average surface roughness Ra not larger than 0.3 nm. Also, the main surfaces can be formed into minor-finished polished surfaces. In the second polishing as well, a double-side polishing apparatus having a configuration similar to that of the double-side polishing apparatus used in the first polishing is used. Specifically, both main surfaces of the annular glass plate are polished while the outer circumferential edge surface of the annular glass plate is held in a holding hole provided in a carrier for polishing of the double-side polishing apparatus. The second polishing processing differs from the first polishing processing in the type and particle size of the loose abrasive particles and the hardness of the resin polishers. The hardness of the resin polishers is preferably lower than that of the resin polishers used in the first polishing processing. For example, a polishing liquid containing colloidal silica as loose abrasive particles is supplied between polishing pads of the double-side polishing apparatus and the main surfaces of the annular glass plate, and the main surfaces of the annular glass plate are polished. It is preferable that the abrasive polishing particles used in the second polishing have an average particle diameter (d50) in a range of 5 to 50 nm. In one embodiment, whether not to perform chemical strengthening processing may be appropriately selected taking the glass composition or the necessity into account. Another type of polishing processing may be added to the first polishing processing and the second polishing processing, and two types of polishing processing performed on the main surfaces may be performed as single polishing processing. The order of the above-described processing may be appropriately changed. As a result of the main surfaces of the annular glass plate being polished as described above, a glass substrate for a magnetic disk that satisfies requirements for glass substrates for magnetic disks can be obtained. Note that it is not always necessary to perform both grinding and polishing of the main surfaces of the annular glass plate, and it is only required to perform at least either of grinding and polishing. For example, a configuration is also possible in which grinding is not performed and polishing is performed.

According to an embodiment, it is preferable not to perform edge surface polishing using a polishing brush on the inner circumferential edge surface and the outer circumferential edge surface of the annular glass plate after performing irradiation with the laser beam and before polishing the main surfaces of the annular glass plate, from the standpoint of manufacturing efficiency. However, additional edge surface polishing for polishing the edge surfaces (separation surfaces) of the annular glass plate may be performed as necessary using a method that differs from the laser polishing processing performed using the laser beam L2, before the first polishing, for example, after the grinding processing and before the first polishing, or before the grinding processing. Even if additional edge surface polishing different from the laser polishing processing is performed, the time it takes to perform the additional edge surface polishing is short because the laser polishing processing has been performed using the laser beam L2. The additional edge surface polishing may be performed using a polishing brush method in which polishing is performed using a polishing brush while loose abrasive particles are supplied to the edge surfaces or a polishing method in which a magnetic functional fluid is used. In the polishing method in which a magnetic functional fluid is used, a slurry obtained by adding abrasive polishing particles to a magnetic viscous fluid is formed into a mass using a magnetic field, for example, the edge surfaces of the annular glass plate are thrusted into the mass, and the edge surfaces are polished by rotating the mass and the annular glass plate relative to each other.

However, it is preferable not to perform the additional edge surface polishing other than the laser polishing processing performed using the laser beam L2, to increase manufacturing efficiency. In this case, the main surfaces of the annular glass plate can be ground or polished in the grinding/polishing processing of the main surfaces while maintaining the roundness of the annular glass plate obtained by being separated from the glass plate 20 and subjected to edge surface polishing performed using the laser beam L2 and maintaining the surface roughness of at least a portion of the molten surfaces.

Thereafter, the annular glass plate on which the grinding/polishing processing has been performed on the main surfaces is washed and inspected, and obtained as a glass substrate for a magnetic disk. By forming magnetic films on the main surfaces of the glass substrate for a magnetic disk, a magnetic disk can be manufactured.

According to an embodiment, an annular glass plate manufactured as described above has the following features.

The annular glass plate has an outer circumferential edge surface and an inner circumferential edge surface, and has a thickness not larger than 0.6 mm. The outer circumferential edge surface and the inner circumferential edge surface of the annular glass plate are constituted by molten surfaces, the molten surfaces in the outer circumferential edge surface and the inner circumferential edge surface each have an arithmetic average surface roughness Ra not larger than 0.1 μm, the surface roughness of the molten surface in the inner circumferential edge surface is larger than the surface roughness of the molten surface in the outer circumferential edge surface, and the molten surfaces in the inner circumferential edge surface and the outer circumferential edge surface do not bulge relative to both main surfaces of the annular glass plate.

Also, according to an embodiment, a glass substrate for a magnetic disk has the following features.

The glass substrate for a magnetic disk has an outer circumferential edge surface and an inner circumferential edge surface, and has a thickness not larger than 0.6 mm. The outer circumferential edge surface and the inner circumferential edge surface of the glass substrate for a magnetic disk are constituted by molten surfaces, the molten surfaces in the outer circumferential edge surface and the inner circumferential edge surface each have an arithmetic average surface roughness Ra not larger than 0.1 μm, the surface roughness of the molten surface in the inner circumferential edge surface is larger than the surface roughness of the molten surface in the outer circumferential edge surface, the molten surfaces in the inner circumferential edge surface and the outer circumferential edge surface do not bulge relative to both main surfaces of the glass substrate for a magnetic disk, and the main surfaces has an arithmetic average surface roughness Ra not larger than 0.3 nm.

As a material of the glass plate 20, the annular glass blank 28, and the annular glass plate in the present embodiment, aluminosilicate glass, soda-lime glass, borosilicate glass, etc., can be used. In particular, aluminosilicate glass can be preferably used from the standpoint that chemical strengthening can be performed and a glass substrate for a magnetic disk that has high strength and includes main surfaces having a high degree of flatness can be manufactured. Amorphous aluminosilicate glass is further preferable.

Although compositions of the glass plate 20, the annular glass blank 28, and the annular glass plate according to the present embodiment are not limited, the glass plate 20, the annular glass blank 28, and the annular glass plate according to the present embodiment are preferably amorphous aluminosilicate glass that has the following composition in which ratios of components are shown in terms of oxides using mol %: 50 to 75% of $SiO_2$, 1 to 15% of $Al_2O_3$, a total of 5 to 35% of at least one component selected from $Li_2O$, $Na_2O$, and $K_2O$, a total of 0 to 20% of at least one component selected from MgO, CaO, SrO, BaO, and ZnO, and a total of 0 to 10% of at least one component selected from $ZrO_2$, $TiO_2$, $La_2O_3$, $Y_2O_3$, $Ta_2O_5$, $Nb_2O_5$, and $HfO_2$.

Preferably, the glass plate 20, the annular glass blank 28, and the annular glass plate according to the present embodiment may be, for example, amorphous aluminosilicate glass that has the following composition in which ratios of components are shown using mass %: 57 to 75% of $SiO_2$, 5 to 20% of $Al_2O_3$ (under the provision that a total of $SiO_2$ and $Al_2O_3$ is 74% or more), a total of more than 0% and not more than 6% of $ZrO_2$, $HfO_2$, $Nb_2O_5$, $Ta_2O_5$, $La_2O_3$, $Y_2O_3$, and $TiO_2$, more than 1% and not more than 9% of $Li_2O$, 5 to 28% of $Na_2O$ (under the provision that a mass ratio $Li_2O/Na_2O$ is not larger than 0.5), 0 to 6% of $K_2O$, 0 to 4% of MgO, more than 0% and not more than 5% of CaO (under the provision that a total of MgO and CaO is not more than 5% and the amount of CaO is larger than the amount of MgO), and 0 to 3% of SrO+BaO.

The glass plate 20, the annular glass blank 28, and the annular glass plate according to the present embodiment may have a composition that includes, as essential components, $SiO_2$, $Li_2O$, $Na_2O$, and at least one alkaline earth metal oxide selected from the group consisting of MgO, CaO, SrO, and BaO, and in which the mole ratio (CaO/(MgO+CaO+SrO+BaO)) of the amount of CaO to a total amount of MgO, CaO, SrO, and BaO is not larger than 0.20, and the glass transition temperature of the glass plate 20, the annular glass blank 28, and the annular glass plate may be at least 650° C. A glass substrate for a magnetic disk having such a composition is preferable as a glass substrate for a magnetic disk that is used for a magnetic disk for energy assisted magnetic recording.

According to an embodiment, the glass plate 20, the annular glass blank 28, and the annular glass plate are preferably constituted by glass that has a glass transition point Tg of at least 500° C., and the glass transition point Tg is more preferably at least 650° C. The higher the glass transition point Tg is, the more thermal contraction that occurs when heat treatment is performed on the glass plate 20 and the glass blank 28 and deformation due to the thermal contraction can be suppressed. Therefore, it is preferable to set the glass transition point Tg to at least 500° C., and more preferably at least 650° C., giving consideration to heat treatment that is performed when magnetic films of a magnetic disk or the like are formed on the substrate 1.

According to an embodiment, the glass plate 20, the annular glass blank 28, and the annular glass plate are preferably constituted by a material that has a linear expansion coefficient not larger than $100 \times 10^{-7}$ [1/K], more preferably not larger than $95 \times 10^{-7}$ [1/K], yet more preferably not larger than $70 \times 10^{-7}$ [1/K], and particularly preferably not larger than $60 \times 10^{-7}$ [1/K]. The lower limit of the linear expansion coefficient of the glass plate 20, the annular glass blank 28, and the annular glass plate is not particularly limited, but for example, is $5 \times 10^{-7}$ [1/K]. The linear expansion coefficient referred to here is a linear expansion coefficient that is determined based on a thermal expansion difference between 100° C. and 300° C. When the linear expansion coefficient is in the ranges described above, it is possible to suppress thermal expansion in heating processing that is performed to form magnetic films or the like on the glass substrate for a magnetic disk, and to suppress heat strain in the glass substrate for a magnetic disk around a held portion thereof when the outer circumferential edge surface and the inner circumferential edge surface of the glass substrate for a magnetic disk are fixedly held by a holing member of a film forming apparatus. A conventional substrate made of an aluminum alloy has a linear expansion coefficient of $242 \times 10^{-7}$ [1/K], for example, but the glass plate 20, the annular glass blank 28, and the annular glass plate according to an embodiment have a linear expansion coefficient of $51 \times 10^{-7}$ [1/K].

EXPERIMENT EXAMPLE

An experiment was carried out to confirm effects of the method for manufacturing an annular glass plate according to the present embodiment. An annular glass blank 28 used in the experiment had an outer diameter of 95 mm, an inner diameter of 25 mm, and a thickness of 0.6 mm. The annular glass blank 28 used in the laser polishing processing was separated from a glass plate 20 by irradiating the glass plate 20 with the laser beam L1 as shown in FIG. 2A, and heating the glass plate 20 as shown in FIG. 4.

Irradiation with the laser beam L2 was performed under conditions that power of the laser beam L2 was 40 [W], Pd×Th was 3.06 [W/mm], and an elliptical spot with a width W1 of 1 mm and a length W2 of 10 mm was used. The annular glass blank 28 was rotated at a relative movement speed of 20 [mm/second].

In the laser polishing processing, the power of the laser beam L2 emitted to the outer circumferential edge surface 28a was fixed, and the ratio of the power of the laser beam L2 emitted to the inner circumferential edge surface 28b to the power of the laser beam L2 emitted to the outer circumferential edge surface 28a was changed to various ratios. The area of an irradiated portion of each edge surface irradiated with the laser beam L2 was fixed to a constant area, and accordingly, the ratio between the powers corresponds to a ratio between power densities. Note that the laser polishing processing was performed separately on the inner circumferential edge surface 28b and the outer circumferential edge surface 28a. As a result, rounded chamfered surfaces were formed in the inner circumferential edge surface and the outer circumferential edge surface.

Thereafter, a glass substrate for a magnetic disk was manufactured by grinding and/or polishing the main surfaces, and furthermore, a magnetic disk was manufactured by forming magnetic films or the like. Grinding and polishing of the main surfaces were performed using the methods described above.

After the laser polishing processing, evaluation of a bulge was performed in an end portion of the main surface of the annular glass plate by using a contact probe profilometer. A probe was moved in a radial direction to measure a shape by scanning an area including a flat intermediate circumferential portion on the inner circumferential side of the main surface and a bulging end portion on the inner circumferential edge surface side. If there was a bulge bulging by at least 1 μm from an extension line of the flat intermediate circumferential portion of the main surface, it was determined that "there was a bulge".

Also, surface roughness (arithmetic average roughness Ra) was measured for each of the inner circumferential edge surface and the outer circumferential edge surface of the annular glass plate using a laser microscope under the conditions described above.

Evaluation results and measurement results of Examples and Comparative Example are shown below in Table 1.

laser beam was performed such that molten surfaces in the outer circumferential edge surface 28a and the inner circumferential edge surface 28b each had an arithmetic average surface roughness Ra not larger than 0.1 μm and the surface roughness (arithmetic average roughness Ra) of the molten surface in the inner circumferential edge surface 28b was larger than the surface roughness (arithmetic average roughness Ra) of the molten surface in the outer circumferential edge surface 28a. More specifically, a bulge is not generated on the inner circumferential edge surface side if the power density of the laser beam L2 emitted to the inner circumferential edge surface 28b is not higher than 80% of the power density of the laser beam L2 emitted to the outer circumferential edge surface 28a.

Although the method for manufacturing an annular glass plate, the method for manufacturing a glass substrate for a magnetic disk, the method for manufacturing a magnetic disk, the annular glass plate, the glass substrate for a magnetic disk, and the magnetic disk according to the present invention have been described in detail, the present invention is not limited to the above-described embodiment, and it goes without saying that various modifications and changes can be made within a scope not departing from the gist of the present invention.

An aspect of this disclosure is a method for manufacturing an annular glass plate that has an outer circumferential edge surface, an inner circumferential edge surface, and a thickness not larger than 0.6 mm. The manufacturing method includes:

processing for manufacturing an annular glass plate by irradiating each of the outer circumferential edge surface and the inner circumferential edge surface of an annular glass blank with a laser beam to melt the outer circumferential edge surface and the inner circumferential edge surface and form molten surfaces, such that the molten surfaces in the outer circumferential edge surface and the inner circumferential edge surface each have an arithmetic average surface roughness Ra not larger than 0.1 μm and the surface roughness of the molten surface in the inner circumferential edge surface is larger than the surface roughness of the molten surface in the outer circumferential edge surface.

It is preferable that a power density of the laser beam emitted to the inner circumferential edge surface is not higher than 80% of a power density of the laser beam emitted to the outer circumferential edge surface.

TABLE 1

| | (Power when irradiating inner circumferential edge surface)/ (power when irradiating outer circumferential edge surface) (%) | Presence or absence of bulge on inner circumferential edge surface side of main surface | Presence or absence of bulge on outer circumferential edge surface side of main surface | Ra (μm) of inner circumferential edge surface | Ra (μm) of outer circumferential edge surface |
|---|---|---|---|---|---|
| Comparative Example | 100 | Present | Absent | 0.01 | 0.01 |
| Example 1 | 80 | Absent | Absent | 0.02 | 0.01 |
| Example 2 | 60 | Absent | Absent | 0.03 | 0.01 |
| Example 3 | 50 | Absent | Absent | 0.04 | 0.01 |
| Example 4 | 40 | Absent | Absent | 0.05 | 0.01 |

Examples 1 to 4 and Comparative Example in the above Table 1 show that a bulge was not generated on the inner circumferential edge surface side when irradiation with the It is preferable that the inner circumferential edge surface and the outer circumferential edge surface of the annular glass blank are irradiated with the laser beam such that the inner circumferential edge surface and the outer circumferential edge surface of the annular glass plate do not bulge relative to both main surfaces of the annular glass plate.

In the method for manufacturing an annular glass plate, it is preferable that defects are intermittently formed along substantially concentric circles by irradiating a glass plate with a cutting laser beam that differs from the laser beam, and circular separation boundary lines, which are line-shaped defects constituted by an inner circumferential circle portion and an outer circumferential circle portion, are formed on a main surface of the glass plate by connecting the defects, an inner portion on the inner side of the outer circumferential circle portion of the glass plate and an outer portion on the outer side of the outer circumferential circle portion are separated from each other by heating the outer portion on the outer side of the outer circumferential circle portion to cause the outer portion to thermally expand relatively largely compared to the inner portion, an outer portion on the outer side of the inner circumferential circle portion of the glass plate and an inner portion on the inner side of the inner circumferential circle portion are separated from each other by heating the outer portion on the outer side of the inner circumferential circle portion to cause the outer portion to thermally expand relatively largely compared to the inner portion, the annular glass blank is obtained by removing the outer portion on the outer side of the outer circumferential circle portion and the inner portion on the inner side of the inner circumferential circle portion from the glass plate.

Another aspect of this disclosure is also a method for manufacturing an annular glass plate that has an outer circumferential edge surface, an inner circumferential edge surface, and a thickness not larger than 0.6 mm. In the manufacturing method, the outer circumferential edge surface and the inner circumferential edge surface of an annular glass blank are each irradiated with a laser beam to melt the outer circumferential edge surface and the inner circumferential edge surface and form molten surfaces, the molten surfaces in the outer circumferential edge surface and the inner circumferential edge surface each have an arithmetic average surface roughness Ra not larger than 0.1 μm, and a power density of the laser beam emitted to the inner circumferential edge surface is not higher than 80% of a power density of the laser beam emitted to the outer circumferential edge surface.

Another aspect of this disclosure is a method for manufacturing a glass substrate for a magnetic disk, wherein a glass substrate for a magnetic disk is manufactured by performing polishing processing at least on main surfaces of the annular glass plate manufactured using the method for manufacturing an annular glass plate.

In this case, it is preferable that edge surface polishing is not performed using a polishing brush on the inner circumferential edge surface and the outer circumferential edge surface of the annular glass plate after performing irradiation with the laser beam and before polishing the main surfaces.

Another aspect of this disclosure is a method for manufacturing a magnetic disk, including forming magnetic films on the main surfaces of the glass substrate for a magnetic disk manufactured using the method for manufacturing a glass substrate for a magnetic disk.

According to the method for manufacturing an annular glass plate, the method for manufacturing a glass substrate for a magnetic disk, and the method for manufacturing a magnetic disk, it is possible to realize edge surface polishing that can be performed in a significantly reduced time when compared to conventional edge surface polishing, and an annular glass plate that does not have a bulge shape at the inner circumferential edge surface (on the inner circumferential side of the main surfaces) can be manufactured.

What is claimed is:

1. An annular glass plate that has an outer circumferential edge surface, an inner circumferential edge surface, and a thickness not larger than 0.6 mm, wherein the outer circumferential edge surface and the inner circumferential edge surface each have an arithmetic average surface roughness Ra not larger than 0.1 μm and the surface roughness of the inner circumferential edge surface is larger than the surface roughness of the outer circumferential edge surface by at least 0.01 μm, the inner circumferential edge surface and the outer circumferential edge surface do not bulge relative to both main surfaces of the annular glass plate, and the surface roughness of the inner circumferential edge surface is not less than 0.02 um.

2. The annular glass plate according to claim 1, wherein the outer circumferential edge surface and the inner circumferential edge surface are constituted by molten surfaces.

3. The annular glass plate according to claim 1, wherein the main surfaces have an arithmetic average surface roughness Ra not larger than 0.3 nm.

4. A magnetic disk comprising:

the annular glass plate according to claim 3; and magnetic films formed on the main surfaces of the annular glass plate.

5. An annular glass plate that has an outer circumferential edge surface, an inner circumferential edge surface, and a thickness not larger than 0.6 mm, wherein the outer circumferential edge surface and the inner circumferential edge surface each have an arithmetic average surface roughness Ra not larger than 0.1 μm and the surface roughness of the inner circumferential edge surface is larger than the surface roughness of the outer circumferential edge surface, the inner circumferential edge surface and the outer circumferential edge surface do not bulge relative to both main surfaces of the annular glass plate, and the surface roughness of the inner circumferential edge surface is larger than the surface roughness of the outer circumferential edge surface by at least 0.01 μm.

6. The annular glass plate according to claim 5, wherein the outer circumferential edge surface and the inner circumferential edge surface are constituted by molten surfaces.

7. The annular glass plate according to claim 5, wherein the main surfaces have an arithmetic average surface roughness Ra not larger than 0.3 nm.

8. A magnetic disk comprising:

the annular glass plate according to claim 7; and magnetic films formed on the main surfaces of the annular glass plate.

9. An annular glass plate that has an outer circumferential edge surface, an inner circumferential edge surface, and a thickness not larger than 0.6 mm, wherein the outer circumferential edge surface has the arithmetic average surface roughness Ra not larger than 0.05 µm, the inner circumferential edge surface has an arithmetic average surface roughness Ra not larger than 0.1 µm, and the surface roughness of the inner circumferential edge surface is larger than the surface roughness of the outer circumferential edge surface by at least 0.01 µm, the inner circumferential edge surface and the outer circumferential edge surface do not bulge relative to both main surfaces of the annular glass plate, and the surface roughness of the inner circumferential edge surface is not less than 0.02 um.

10. The annular glass plate according to claim 9, wherein the outer circumferential edge surface and the inner circumferential edge surface are constituted by molten surfaces.

11. The annular glass plate according to claim 9, wherein the main surfaces have an arithmetic average surface roughness Ra not larger than 0.3 nm.

12. A magnetic disk comprising:

the annular glass plate according to claim 11; and magnetic films formed on the main surfaces of the annular glass plate.

\* \* \* \* \*